United States Patent [19]

Ishida et al.

[11] Patent Number: 5,223,886
[45] Date of Patent: * Jun. 29, 1993

[54] AF CAMERA SYSTEM

[75] Inventors: Tokuji Ishida; Masataka Hamada; Jun Hasegawa; Kenji Ishibashi; Toshio Norita; Hiroshi Ootsuka, all of Osaka, Japan

[73] Assignee: Minolta Camera Kabushiki Kaisha, Osaka, Japan

[*] Notice: The portion of the term of this patent subsequent to Nov. 27, 2007 has been disclaimed.

[21] Appl. No.: 756,424

[22] Filed: Sep. 9, 1991

Related U.S. Application Data

[62] Division of Ser. No. 640,268, Jan. 10, 1991, and Ser. No. 276,920, Nov. 28, 1988, Pat. No. 4,998,124.

[30] Foreign Application Priority Data

Nov. 26, 1987 [JP] Japan ................ 62-299063
Nov. 26, 1987 [JP] Japan ................ 62-299064
Nov. 26, 1987 [JP] Japan ................ 62-299065
Nov. 26, 1987 [JP] Japan ................ 62-299066

[51] Int. Cl.$^5$ ............................................. G03B 13/36
[52] U.S. Cl. .................................................. 354/409
[58] Field of Search ............... 354/400, 402, 403, 409, 354/430

[56] References Cited

U.S. PATENT DOCUMENTS

| | | | |
|---|---|---|---|
| 4,373,791 | 2/1983 | Araki | 352/140 X |
| 4,432,628 | 2/1984 | Sakurada et al. | 354/289.12 |
| 4,447,719 | 5/1984 | Ogasawara | 354/409 X |
| 4,457,604 | 7/1984 | Tsuboi | 354/145.1 |
| 4,508,443 | 4/1985 | Matsuzaki et al. | 354/402 |
| 4,636,055 | 1/1987 | Alyfuku | 354/465 |
| 4,641,942 | 2/1987 | Sakai et al. | 354/406 |
| 4,662,736 | 5/1987 | Taniguchi et al. | 354/412 |
| 4,687,915 | 8/1987 | Sakai et al. | 354/402 X |
| 4,709,138 | 11/1987 | Suda et al. | 354/408 X |
| 4,762,986 | 8/1988 | Suda et al. | 354/402 X |
| 4,766,302 | 8/1988 | Ishida et al. | 354/408 X |
| 4,783,677 | 11/1988 | Hamada et al. | 354/402 |
| 4,816,856 | 3/1989 | Hamada et al. | 354/402 |
| 4,831,403 | 5/1989 | Ishida et al. | 354/402 |
| 4,855,776 | 8/1989 | Akashi | 354/402 |
| 4,860,045 | 8/1989 | Hamada et al. | 354/402 |
| 4,974,005 | 11/1990 | Izumi et al. | 354/400 |
| 4,998,124 | 3/1991 | Ishida et al. | 354/402 |

Primary Examiner—W. B. Perkey
Attorney, Agent, or Firm—Burns, Doane, Swecker & Mathis

[57] ABSTRACT

An AF camera system for automatically controlling an objective lens for focusing an object includes a focus detector for generating a defocus data DF carrying information of a defocus amount and a defocus direction based on a focus condition of an object to be focused through an objective lens detected in a detection cycle, an infocus detector for detecting an infocus condition based on the defocus data, a lens driver for driving the objective lens based on the defocus amount and defocus direction carried in the defocus data DF when the infocus detection mean did not detect the infocus condition; and a control for controlling the focus adjustment based on defocus data and/or the detection of the infocus condition detected by the infocus detection means.

7 Claims, 14 Drawing Sheets

Fig. 11

```
      FOCUS DETECTION
      CAL STEP #4
            │
            ▼
      ┌──────────────┐
      │ READ         │ #108
      │ TM VALUE     │
      └──────────────┘
            │
            ▼
      ┌──────────────┐
      │ TM' ← TM     │ #109
      └──────────────┘
            │
            ▼     #110
          ╱╲        N
         ╱  ╲──────────┐
        ╱LOW ╲         │
        ╲LUMI╱         │
         ╲FLAG         │
          ╲SET╱        │
           ╲╱          │
            │Y         │
            ▼          │
      ┌──────────────┐ │
      │ AUX LIGHT ON │#111
      └──────────────┘ │
            │          │
            ◄──────────┘
            ▼
      ┌──────────────┐
      │ CCD INTEG    │ #112
      └──────────────┘
            │
            ▼
      ┌──────────────┐
      │ DATA         │ #113
      │ DUMPING      │
      └──────────────┘
            │
            ▼
      ┌──────────────┐
      │ CORRELATION  │ #114
      │ CAL          │
      └──────────────┘
            │
            ▼
      ┌──────────────┐
      │ COMPENSATION │ #115
      │ CAL          │
      └──────────────┘
            │
            ▼
      ┌──────────────┐
      │ PITCH CAL    │ #116
      └──────────────┘
            │
            ▼
          ( RET )
```

AF CAMERA SYSTEM

This application is a divisional of application Ser. No. 07/640,268, filed Jan. 10, 1991, and a divisional of Ser. No. 07/276,920, filed Nov. 28, 1988, now U.S. Pat. No. 4,998,124.

BACKGROUND OF THE INVENTION

1. Field of the Invention

The present invention relates to a camera equipped with an automatic focusing system and, more particularly, to an AF (auto-focus) single lens reflex camera.

2. Description of the Prior Art

Conventionally, a camera is proposed having an AF (automatic focusing) system which carries out the automatic focus adjustment based on a plurality of focus detection results. For example, in Japanese Patent Laid-open publication Nos. 56-78811, 57-128307 and 62-125311, the focus detection is carried out for a plurality of number of times to provide a plurality of defocus amounts. Then, the focus adjustment is carried out using the plurality of defocus amounts. However, in the prior art AF system, there are a number of disadvantages as explained below.

When the defocus amounts obtained in the present cycle and the previous cycle (herein, previous cycle means one cycle before the present cycle) have different signs (plus and minus) and, at the same time, none of the defocus amounts obtained in the past three subsequent cycles are in infocus condition, these focus detected results are disregarded and not used in the control. For example, in the case where the aiming object has a low luminance or low contrast, the focus detection is carried out for a plurality of number of times to obtain an average defocus amount with which the lens drive is controlled. However, even if an infocus detection is obtained during the series of focus detections for obtaining the average, such an infocus detection information is buried in the average focus amount. Thus, it takes long time before the infocus condition is obtained. Also, when the object is moving towards or away from the camera to generate a monotonously increasing or decreasing defocus amounts, an average of such defocus amounts will not provide the true defocus amount and, therefore, it takes long time before the infocus condition is obtained.

In the conventional AF system, the algorithm for a continuous mode (a mode in which the lens drive is constantly controlled in compliance with the moving object) is the same regardless of the presence and absence of the shutter release request. When the shutter release request is present to take a photography of a moving object, there is a time lag between a moment when the final focus detection is carried out and a moment when the shutter is actually release. Therefore, the focus adjustment effected at the time of shutter release based on the final focus detection will not result in an accurate focus adjustment.

In the conventional AF system, the focus adjusting mode, which is selectable between a single lock mode (a mode in which the focus adjustment condition is maintained once the infocus condition is obtained) and the continuous mode, is not switched automatically before and after obtaining the infocus condition.

In the conventional AF system, the focus adjusting mode, which is selectable among the single mode, the continuous mode, and the average mode (a mode in which the infocus condition is obtained based on an average of a plurality of defocus amounts), is not selected automatically.

SUMMARY OF THE INVENTION

The present invention has been developed with a view to substantially solving the above-described disadvantages and has for its essential object to provide an improved AF camera system which can automatically control the focus adjustment.

According to a first preferred embodiment of the present invention as shown in FIG. 1a, AF camera system for automatically controlling an objective lens for focusing an object comprises:

- a focus detection means 101 for generating a defocus data DF carrying information of a defocus amount and a defocus direction based on a focus condition of an object image to be focused through a objective lens detected at a detection cycle;
- a focus condition memory means 102 for storing at least defocus data DFa, DFb and DFc obtained respectively in a present detection cycle, a previous detection cycle and a cycle before the previous detection cycle;
- a first infocus detection means 103 for detecting an infocus condition based on each defocus data;
- a second infocus detection means 104 for detecting an infocus condition based on an average of the stored defocus data DFa, DFb and DFc;
- a first lens drive control means 105 for driving the objective lens when the first infocus detection means did not detect the infocus condition, and for stopping the objective lens when the first infocus detection means has detected the infocus condition;
- a second lens drive control means 106 for driving the objective lens when the second infocus detection means did not detect the infocus condition, and for stopping the objective lens when the second infocus detection means has detected the infocus condition; and
- a select means 107 for selecting the second infocus detecting means 104 and the second lens control means 106 to be operative in a case when none of the defocus data DFa, DFb and DFc is within an acceptable or tolerance range to be considered as an infocus condition and, at the same time, the defocus direction of the defocus data obtained in the present and previous detection cycles shows opposite directions.

According to the first preferred embodiment given above, focus detection means 101 detects in a detection cycle the focus condition of the objective lens with respect to an object to be focused, and generates defocus data DF carrying defocus amount and defocus direction.

Focus condition memory means 102 stores the defocus data DF as a defocus data DFa obtained in the present detection cycle. When another defocus data DF is obtained in the next detection cycle, the defocus data DFa obtained in the previous detection cycle is now stored as defocus data DFb. Furthermore, when further defocus data DF is obtained in the next detection cycle, the defocus data DFb is then stored as defocus data DFc. In this manner, the latest three defocus data are stored as defocus data DFa, DFb and DFc. The absolute value thereof represents the defocus amount and the plus or minus sign represents the defocus direction.

First infocus detection means 103 carries out an infocus detection based on the each defocus data after each focus detection effected by the focus detection means 101 in such a manner that the defocus amount is within an acceptable or tolerance range to be considered as an infocus condition.

Second infocus detection means 104 carries out an infocus detection based on an average of the defocus data DFa, DFb and DFc stored in the focus condition memory means 102. Therefore, in the first and second detection cycles, the infocus detection is possible only by the first infocus detection means 103, and after the third detection cycle, the infocus detection is possible also by the second infocus detection means 104.

After the third detection cycle, if none of the defocus data DFa, DFb and DFc is within an acceptable or tolerance range to be considered as an infocus condition and, at the same time, the defocus direction of the defocus data obtained in the present and previous detection cycles shows opposite directions, select means 107 selects the second infocus detecting means 104 and the second lens control means 106 to be operative. In this case, if the average defocus data is detected to be within an acceptable or tolerance range to be considered as an infocus condition, the second lens drive control means 106 stops the lens drive, but if not, the second lens drive control means 106 drives the lens based on the average defocus data $(DFa+DFb+DFc)/3$.

After the lens drive, a defocus data obtained by the focus detection means 101 is stored in focus condition memory means 102 as a new defocus data DFa and, in this manner, defocus data DFb and DFc are renewed and the oldest defocus data is ejected. Under this condition, if the infocus condition is detected by the second infocus detection means 104 using the new average defocus data, the second lens drive control means stops the lens drive and if not detected, the same operation is repeated.

The first embodiment given above is fully described in connection with FIG. 10 in which an average mode II shown in the flow chart corresponds to the second infocus detection means 104 and the second lens drive control means 106. Also, select means 107 corresponds to steps #30, #31, #32 and #36 in FIG. 5 for selecting the average mode II.

According to a second preferred embodiment of the present invention as shown in FIG. 1b, AF camera system for automatically controlling an objective lens for focusing a object comprises:

- a focus detection means 201 for generating a defocus data DF carrying information of a defocus amount and a defocus direction based on a focus condition of an object to be focused through an objective lens detected at a detection cycle;
- a focus condition memory means 202 for storing at least defocus data DFa' and DFb obtained respectively in a present detection cycle and a previous detection cycle;
- an infocus detection means 203 for detecting an infocus condition based on each defocus data;
- a shutter release button means 205 for requesting a shutter release operation;
- a shutter release request detection means 206 for detecting the shutter release request produced by the shutter release button means 205;
- a moving speed calculation means 207 for calculating a moving speed of the object based on the defocus data DFa and DFb obtained in the present and previous detection cycles;
- a continuous mode control means 208 for producing a drive signal to drive the lens, by using the calculated speed, by a lens drive means 204 to acquire an infocus condition of the object; and
- a continuous mode detection means 209 for making the continuous mode control means 208 to be operative in response to the detection of the shutter release request by the shutter release request detection means 206 under such a condition when the defocus data of the present and previous cycles have the same defocus direction and, at the same time, the defocus data of the present and previous cycles are not in the infocus condition.

According to the second preferred embodiment given above, moving speed calculation means 207 calculates the moving speed of the object based on at least the defocus data obtained in the present and previous detection cycles. The use of three of more defocus data results in the object speed detection with a higher accuracy.

The continuous mode control means 208 produces a drive signal to drive the objective lens by a lens drive means 204 to acquire an infocus condition of the object by using the calculated speed. The continuous mode control means 208 is made operative by continuous mode detection means 209 in response to the detection of the shutter release request by the shutter release request detection means 206 under such a condition when the defocus data of the present and previous cycles have the same defocus direction and, at the same time, the defocus data of the present and previous cycles are not in the infocus condition. Therefore, when the shutter release is requested after only two detection cycles, the continuous mode operation is carried out with a small amount of information so far obtained, and to fulfill the shutter release request as fast as possible. On the contrary, when the shutter release request is not present, there is no need to hasten the continuous mode operation and, therefore, the program waits until three or more detection cycles pass so as to enable as precise continuous mode operation as possible.

In this manner, by changing the algorithm of the continuous mode between the presence and absence of the shutter release request, a rough continuous mode operation can be effected, if necessary, when the shutter release request is present, and an accurate continuous mode operation can be effected when the shutter release request is not present.

Also, since the actual shutter release effected by shutter release means 211 by the permission from shutter release permit means 210 is possible only when infocus detection means 203 detects the infocus condition, the shutter release is effected only when the infocus condition is obtained and, therefore, there will be no fear of obtaining an out-of-focus picture.

The second embodiment given above is fully described particularly in connection with FIG. 5 steps #23, #30, #37 and #38 which correspond to continuous mode detection means 209.

According to a third preferred embodiment of the present invention as shown in FIG. 1c, AF camera system for automatically controlling an objective lens for focusing an object comprises:

- a focus detection means 301 for generating a defocus data DF carrying information of a defocus amount and a defocus direction based on a focus condition of an object to be focused through an objective lens detected in a detection cycle;

an infocus detection means 302 for detecting an infocus condition based on the defocus data;

a lens drive means 303 for driving the objective lens based on the defocus amount and defocus direction carried in the defocus data DF when the infocus detection means did not detect the infocus condition; and a control means 304 for controlling the focus adjustment such that a focus adjustment operation mode is changed to a different focus adjustment operation mode after the detection of the infocus condition detected by the infocus detection means.

According to the third preferred embodiment given above, control means 304 controls the focus adjustment such that a focus adjustment operation mode is changed to a different focus adjustment operation mode after the detection of the infocus condition detected by the infocus detection means. Here, the different mode may be either one of a continuous mode in which the focus adjustment is corrected, in compliance with the speed of the movement of the object, when the object moves and the focus condition is shifted in a monotonic direction after once obtaining the infocus condition, an average mode in which the lens drive is effected based on an average of the defocus amounts obtained in a number of detection cycles when the defocus amounts varies at random, or a focus lock mode in which the lens drive stops once the infocus condition is obtained even when the infocus condition is lost thereafter.

According to a fourth preferred embodiment of the present invention as shown in FIG. 1d, AF camera system for automatically controlling an objective lens for focusing an object comprises:

a focus detection means 401 for generating a defocus data DF carrying information of a defocus amount and a defocus direction based on a focus condition of an object to be focused through an objective lens detected at a detection cycle;

a focus condition memory means 402 for storing at least defocus data DFa, DFb and DFc obtained respectively in a present detection cycle, a previous detection cycle and a cycle before the previous detection cycle;

a lens drive control means 403 for driving the objective lens based on one of the three different focus adjustment control modes; and select means 404 for selecting one of three different focus adjustment control modes based on three defocus data stored in the focus condition memory means.

According to the fourth preferred embodiment given above, lens drive control means 403 drives the objective lens based on one of three different focus adjustment control modes, which are, for example, a standard mode in which the focus adjustment is carried out after each defocus data, an average mode in which the focus adjustment is effected based on an average of the defocus amounts obtained in a number of detection cycles, and a continuous mode in which the focus adjustment is carried out constantly with respect to a moving object.

Select means 404 selects one of three different focus adjustment control modes based on three defocus data stored in the focus condition memory means 402. For example, when three defocus data in memory means 402 show the same defocus direction, it is assumed that the object is moving and, therefore, the continuous mode is selected. When the defocus data in the present and previous detection cycles show opposite defocus directions, it is assumed that the object is unstable and, therefore, the average mode is selected. When the defocus data obtained in the present and previous cycles have the same defocus direction and the defocus data obtained in the cycle before the previous cycle has a different defocus direction, it is assumed that the object is still and, therefore, the standard mode is selected.

It is noted that the select means 404 may select a mode only after three defocus data are stored in the focus condition memory means 402, meaning that at least three detection cycles must be carrying out.

Preferably, the AF camera system shown in FIG. 1d further comprises an infocus detection means 405 for detecting an infocus condition based on the defocus data obtained from the focus detection means. When the infocus detection means detects that none of three consecutive defocus data are in infocus condition, the select means 404 selects one of the three focus adjustment control modes so as to operate the lens drive control means based on three defocus data DFa, DFb and DFc stored in focus condition memory means 402. And, when the infocus detection means detects that, after the start of the focus detection operation, the first and second detection cycles resulted not in infocus condition, the select means 404 selects the standard focus adjustment control mode.

The fourth embodiment given above is fully described particularly in connection with FIG. 5 steps #32 and #36 which correspond to the select means 404.

BRIEF DESCRIPTION OF THE DRAWINGS

These and other objects and features of the present invention will become clear from the following description taken in conjunction with a preferred embodiment thereof with reference to the accompanying drawings, in which:

FIGS. 4 through 12 are flow charts showing an operation of the automatic focusing system shown in FIG. 2.

DETAILED DESCRIPTION OF THE INVENTION

Figure 1A:
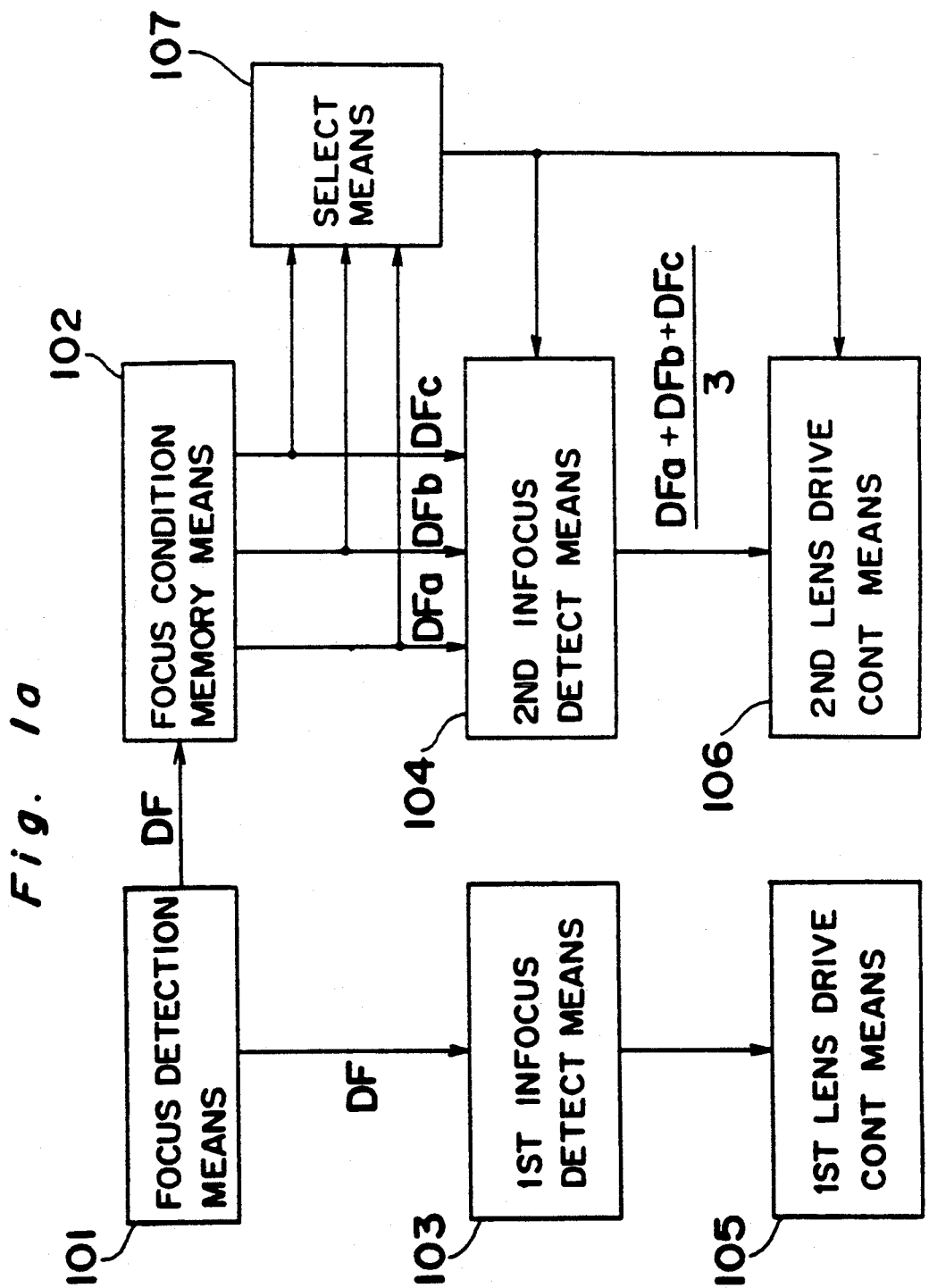
FIGS. 1a through 1d are block diagrams of an automatic focusing system according to the present invention, viewed from different angles.
Figure 1B:
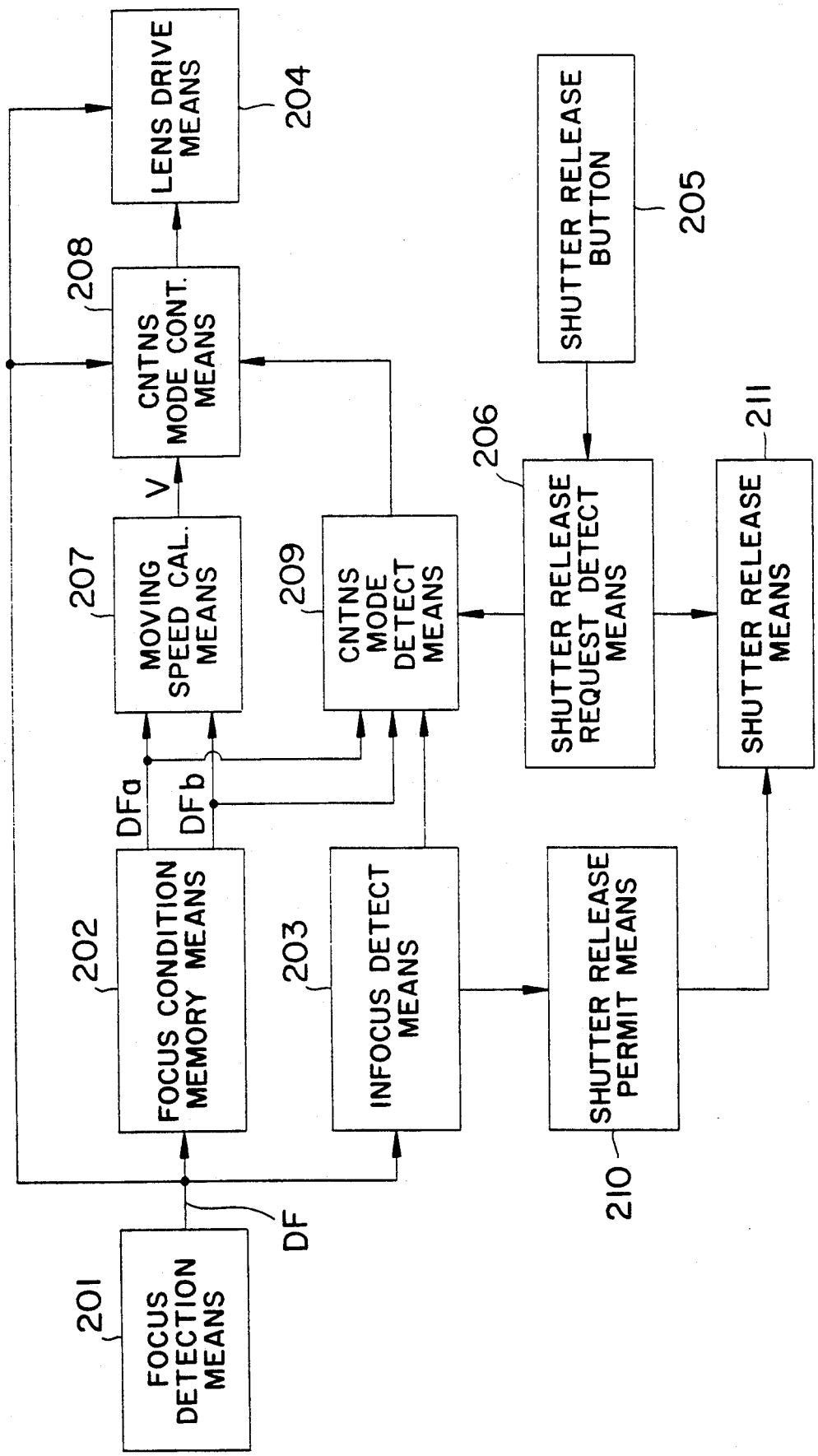
Figure 1C:
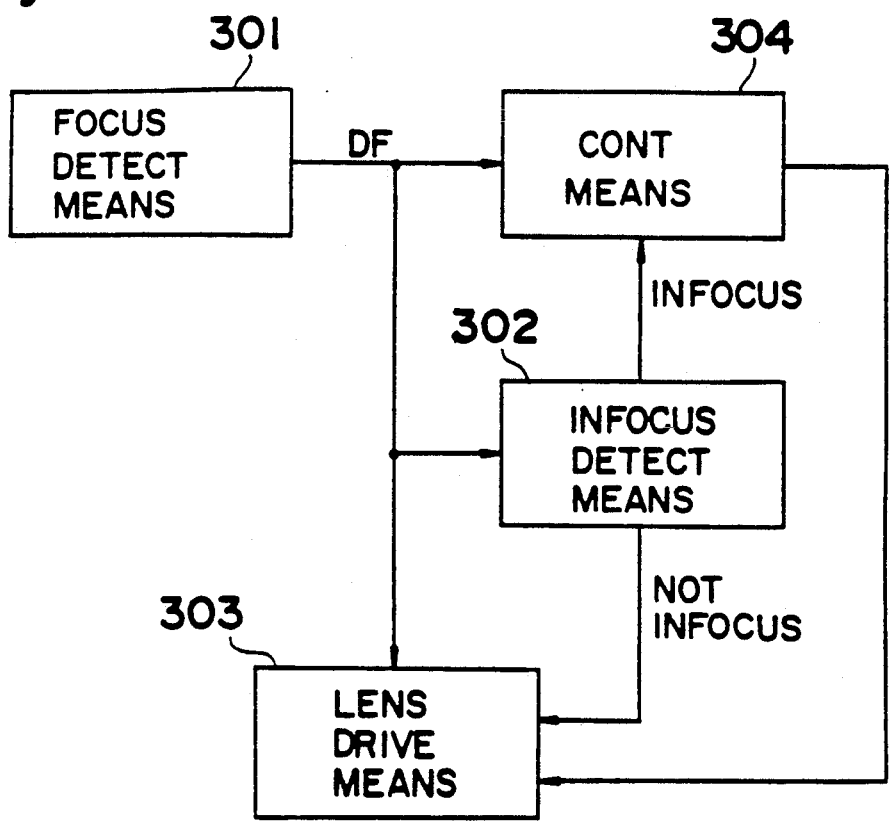
Figure 1D:
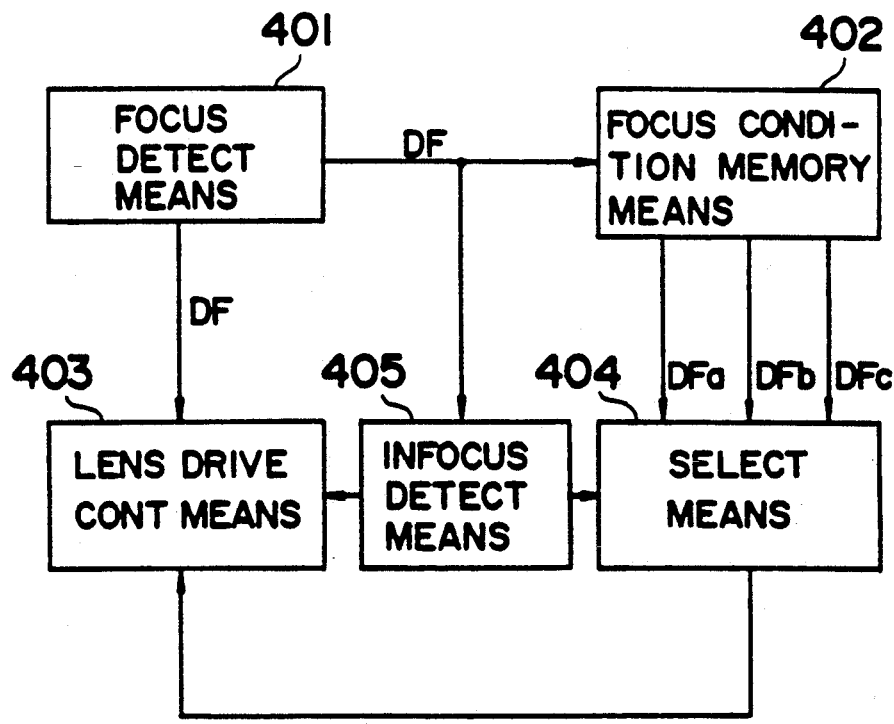
Figure 2:
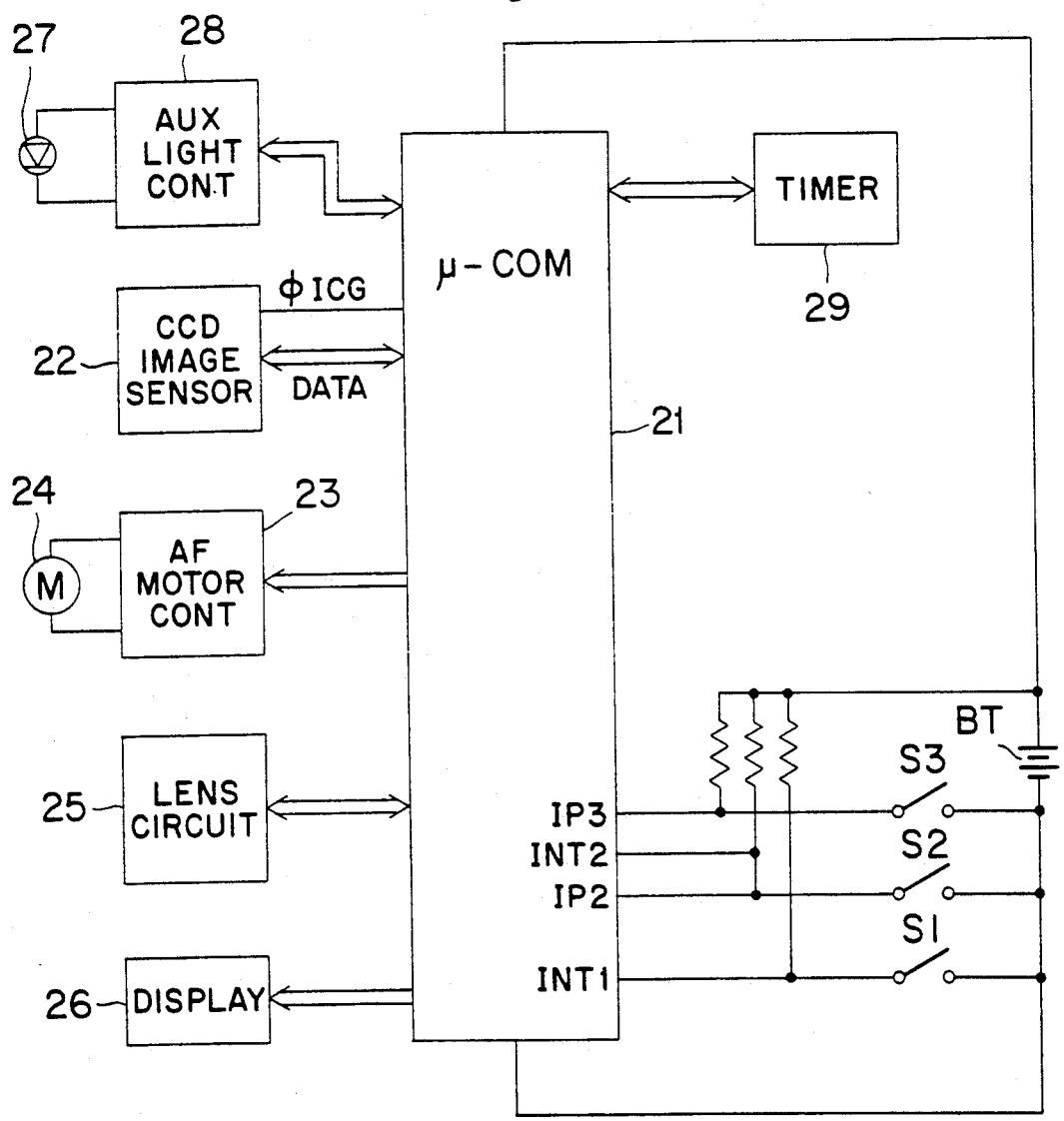
FIG. 2 is a block diagram of the automatic focusing system according to the preferred embodiment of the present invention.

Referring to FIG. 2, a block diagram of a hardware construction employed in a camera is shown according to a preferred embodiment of the present invention. In the drawing, reference number 21 represents a microcomputer for the AF (auto-focus) control, and 22 represents a CCD image sensor for use in the AF control. CCD image sensor 22 starts integration upon receipt of an integration start signal $\phi$ICG from microcomputer 21 and when the integration procedure is completed, the integrated analog data from each picture element is converted to digital data and is applied to microcomputer 21. Microcomputer 21 then starts calculation using the data of picture elements from CCD image sensor 22 to obtain a defocus amount representing an amount of out of focus of an object. After the calculation, microcomputer 21 controls the lens movement so as to make the defocus amount substantially equal to zero. Since the conversion coefficient k representing the relationship between the amount of movement of the lens and the defocus amount differs relatively to the lens type, the conversion coefficient k is stored in each interchangeable lens, particularly in a lens circuit 25 embedded in the lens. Microcomputer 21 reads the conversion coefficient k from lens circuit 25 and multiplies the calculated defocus amount by the conversion coefficient k to obtain a number of pulses necessary to move the lens to the infocus position. Then, microcomputer 21 generates the calculated number of pulses which are applied to AF motor control 23 for driving the lens. Thus, AF motor control 23 drives AF motor 24, connected to the lens, by an amount corresponding to the number of pulses generated from microcomputer 21.

Figure 3:
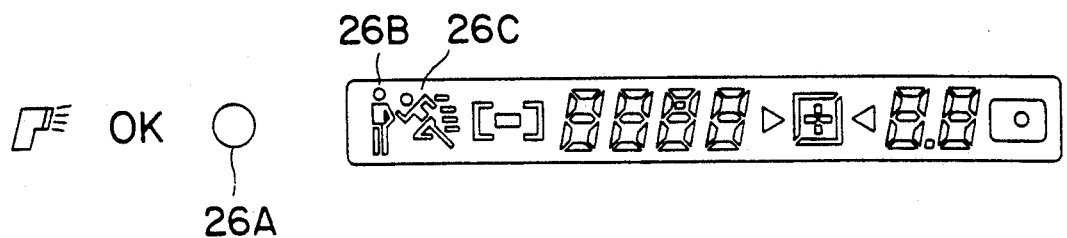
FIG. 3 is a plan view of a display employed in the automatic focusing system of FIG. 2.

Reference number 26 represents a display for showing symbolized data, such as shown in FIG. 3.

Referring to FIG. 3, a circle dot 26A is an LED which can produce green light or red light for indicating the infocus condition and the failure of focus detection, respectively. When the defocus amount is calculated and after the lens has been driven, LED 26A generates green light upon obtaining of the infocus condition, but when the defocus amount can not be calculated due to the reason which will be explained later, LED 26A generates blinking red light indicating that the infocus condition can not be accomplished.

In FIG. 3, LEDs 26B and 26C are provided to show a selected focusing mode. When an object to be photographed is still, a single mode is selected so that, once the lens is focused to the still object, the lens is maintained in that focused position. In the single mode, LED 26B lights up. On the other hand, when an object to be photographed is moving, a continuous focus mode is selected so that, the lens continuously moves to keep the focused condition with respect to the moving object. In the continuous mode, LED 26C lights up.

Referring back to FIG. 2, when a shutter release button (not shown) is depressed to its halfway, a switch S1 turns on to provide a signal to a port INT1 to start an AF interruption procedure for the AF operation, which will be described in detail later. When a shutter release button is further depressed, a switch S2 turns on to provide a signal to a port INT2 to start a release interruption procedure for the shutter release operation, which will be described in detail later. It is noted that the release interruption procedure as initiated by the signal from port INT2 may be prohibited by a program. Thus, switch S2 is also connected to a port IP2 of miorocomputer 21, so that even when the release interruption procedure is prohibited, microcomputer 21 is informed of the operator's shutter release request by the signal input through port IP2. A switch S3 is a mirror up switch which turns on when a mirror (not shown), provided in the camera body for directing lights passing through the objective lens to a viewfinder, flips up completely to allow the lights from the objective lens to a film surface for the exposure, and turns off when a shutter mechanism (not shown) is set to a charged condition after the exposure.

Reference number 27 is an LED, controlled by an auxiliary light control 28, for emitting infrared light (auxiliary light) to an object to be photographed when the luminance of the object is relatively low. When microcomputer 21 detects that the object to be photographed has a low luminance, microcomputer 21 provides an auxiliary light emit signal to auxiliary light control 28 and, at the same time, integration start signal $\phi$ICG to CCD image sensor 22. The auxiliary light emit signal applied to control 28 ends when the integration by the CCD is completed. Thus, the auxiliary light is produced during the integration is being carried out by the CCD, and is turned off when the CCD integration is over. Thus, when a low luminance object is being aimed, CCD image sensor 22 carries out the integration under the aid of auxiliary light.

Reference number 29 is a timer used for calculating the speed of change of the focusing position of the lens with respect to a moving object. Timer 29 is reset to zero in response to the turn on of switch S1, i.e., at the starting point of the AF operation, and counts the time after the start of the AF operation. Thus, it is possible to monitor the time elapsed after the start of the AF operation by observing the counted value TM of counter 29. The description so far given is directed to the hardware part of the preferred embodiment of the present invention.

Next, an algorithm of the preferred embodiment of the present invention will be described. According to the embodiment, the object is observed to detect whether the object is still (such an object is called a still object) or the object is moving (such an object is called an active object). When the still object is detected, the single mode is set automatically, and when the active object is detected, the continuous mode is set automatically. Each focusing mode will be described in detail below.

The single mode is used in the following situation. After defocus amount of the object to be photographed which is captured within a certain area (hereinafter referred to a focus frame) in the viewfinder is detected, the lens is moved to properly focus on the object. Sometimes, the operator has such a desire that the object to be focused is located within the viewfinder, but outside the focus frame. In such a case, the operator first aims the camera to locate the object within the focus frame and, after the AF operation, he moves the camera without changing the focusing condition, to bring the object at his desired location within the viewfinder. In the single mode, the shutter release is effected without changing the focusing condition, once it has been set.

The continuous mode is used in the situation when the object is moving. When the object is moving, the defocus amount of the object captured in the focus frame changes incessantly. If such a change is so small that it can be absorbed within the range of depth of field measured on the film surface, there will be no substantial problem, but if the defocus change exceeds the depth of field, it is necessary to continuously change the focusing position of the lens relatively to the change of the defocus amount. According to the present invention, the continuous mode is offered for photographing such a moving object, under which mode the object is kept in the infocus condition during its movement by the detection of the change of object's image forming plane. Also, under the continuous mode, an anticipation control method is included such that the movement of the object during a time lag between the moment when the operator depresses the shutter button and the moment when the shutter actually opens to expose the film is anticipated, so as to obtain an infocus condition of the object image on the film surface at the exposure timing.

By the employment of the continuous mode, properly focused pictures can be obtained even when photographing the moving objects.

Next, operations are described with reference to the flow charts shown in the drawings.

Figure 4:
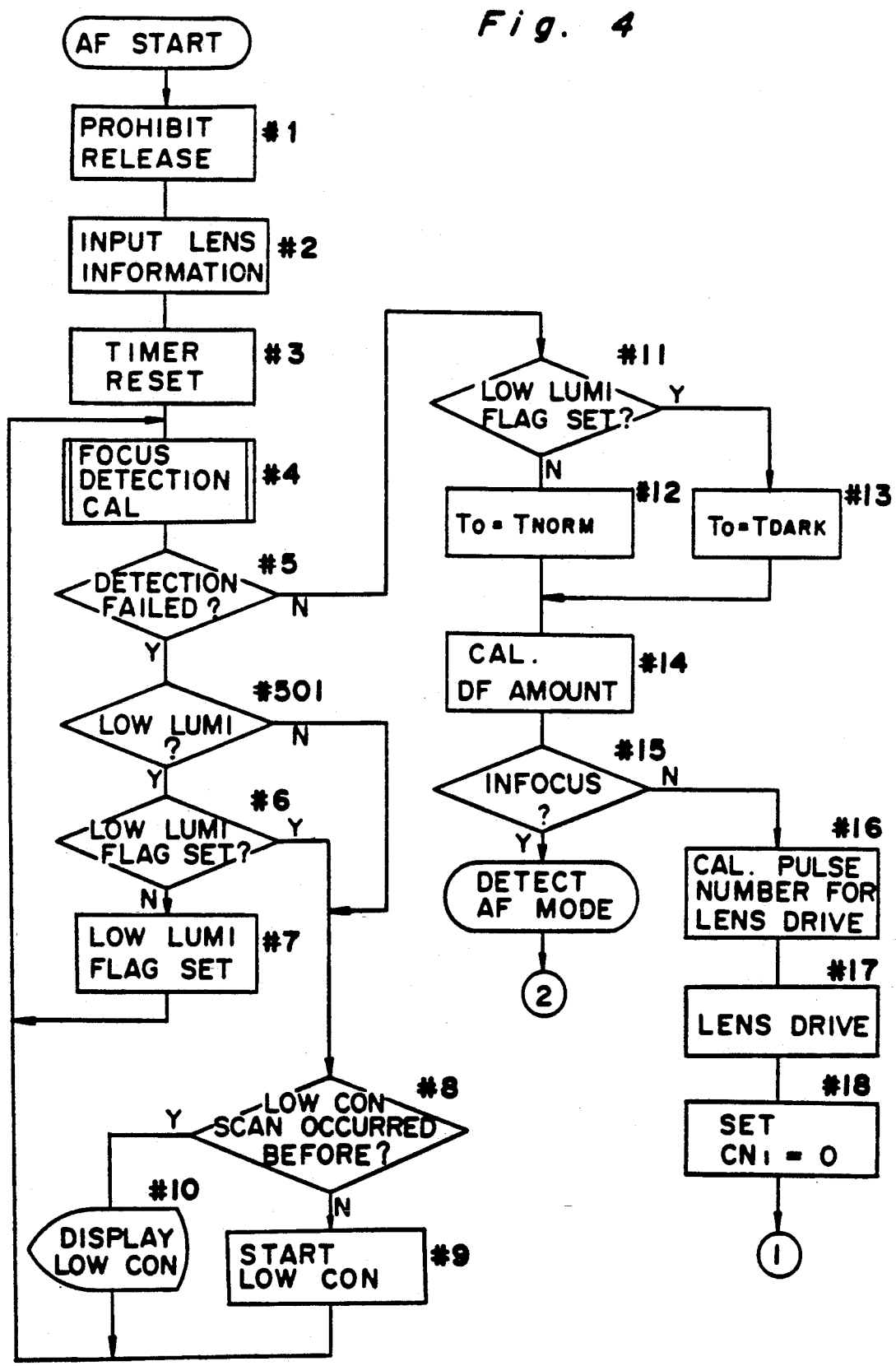

Referring to FIG. 4, when the shutter release button is depressed to its halfway to turn switch S1 on, AF operation starts. At step #1, the release interruption procedure, which is initiated by the signal applied to port INT2, is prohibited so that even when the shutter release button is depressed fully, a release routine will not be called, thus the shutter release operation will not be effected. Then, at step #2, microcomputer 21 fetches from lens circuit 25 (FIG. 2) a conversion coefficient k which will be used to calculate the number of pulses necessary to drive the lens from the defocus position to infocus position. At step #3, timer 29 is reset to enable the monitoring of the time when the distance measuring is effected. At step #4, focus detection calculation is carried out, the detail of which will be described below.

Referring to FIG. 11, a flow chart of the subroutine for the focus detection calculation is shown. At step #108, a count value TM of timer 29 is read, and at step #109, the read value is stored in a memory area of microcomputer 21 as a count value TM' representing the start time of the CCD integration. When the object has a low luminance, the amount of light impinging on the CCD image sensor 22 is insufficient to carry, out the integration. In such a case it is necessary to use the auxiliary light. The necessity of the auxiliary light is detected by the low luminance flag. Therefore, at step #110, it is detected whether the low luminance flag is set or not. If it is set, the program goes to step #111 to emit the auxiliary light, and if not, the program skips step #111 and goes to step #112. Since the low luminance flag is initially reset at the very beginning of the AF operation, the program goes to step #112 to carry out the CCD integration in the first cycle operation. CCD image sensor 22 is primarily provided for obtaining image information for the focus detection calculation, and the accumulated image information is also used for detecting the luminance information of the object. At step #113, data dumping is carried out for sending the data obtained from each picture element in the CCD image sensor to microcomputer 21.

The following steps #114, #115 and #116 are provided for correlation calculation, compensation calculation and pitch calculation for focusing, respectively, which are fully disclosed in U.S. Pat. No. 4,766,302.

Returning back to FIG. 4, when the focus detection calculation step #4 is completed in a manner described above, it is detected at step #5 whether the focus detection obtained in step #4 has a sufficient reliability or not, i.e., whether the focus detection in step #4 was successful or in fail. If the focus detection was not successful, the program goes to step #501, and if the same was successful, the program goes to step #11. At step #501, it is detected whether or not the object has a low luminance. Since the CCD integration in the first cycle operation in step #4 is carried out without the aid of auxiliary light, there may be a case in which the focus detection resulted in failure. In such a case, the program goes to step #501 at which it is detected that the object has a low luminance. Thus, the program further goes to step #6 to detect whether the low luminance flag is set or not. If not, then the low luminance flag is set at step #7 and the program returns to step #4 to carry out the focus detection for the second time. In this case, the focus detection will be carried out with the aid of auxiliary light 27.

On the contrary, when it is so detected at step #501 that the object does not have a low luminance, or when it is so detected at step #6 that the low luminance flag is set and the CCD integration has been carried out with the aid of auxiliary light, it is so determined that the contrast of the object is low (referred to as a low contrast condition), such as a snow scene. In this case, the program goes to step #8 at which it is detected whether or not a low contrast scan has been carried out before. The low contrast scan is a particular focus detection calculation in which the lens is scanned from focusing end to the other focusing end and in the mean time, focus detection is carried out incessantly. If no low contrast scan has been carried out before, the program goes to step #9 to carry out the low contrast scan. On the other hand, if the low contrast scan has been carried out before, the program goes to step #10 to display the low contrast indicating that the focus detection is not possible. The low contrast display is done by LED 26A (FIG. 3) blinking in red.

At step #5, if it is so detected that the focus detection is successful, the program goes to step #11 at which it is detected whether the low luminance flag is set or not. This detection is necessary because the CCD integration time length is different depending whether the auxiliary light is on or not. To this end, sampling cycle period To for repeatedly obtaining the defocus amount is set individually for the case when the auxiliary light is not used (step #12) and for the case when the auxiliary light is used (step #13). At step #14, defocus amount is calculated using the result of the focus detection calculation. At step #15, it is detected whether the calculated defocus amount is within an acceptable or tolerance range to be considered as an infocus condition, or not. If yes, the program goes to step #441 in FIG. 6 for AF mode detection routine, but if it is no, the program goes to step #16. Usually, at the beginning of the AF operation, the lens position is not yet determined and, therefore, it is very rare that the lens is in the range of infocus condition. Thus, in the most cases, the program advances to step #16.

At step #16, a number of pulses for driving lens is calculated using the calculated defocus amount obtained at step #14 and the conversion coefficient k obtained at step #2. Thereafter, at step #17, lens is driven in accordance with the number of pulses calculated at step #16. Then follows is a routine for detecting the condition of the object. At step #18, counter CN1 is cleared to zero so that it can count the number of times the infocus detections are carried out in the routine following step #19 in FIG. 5.

Figure 5:
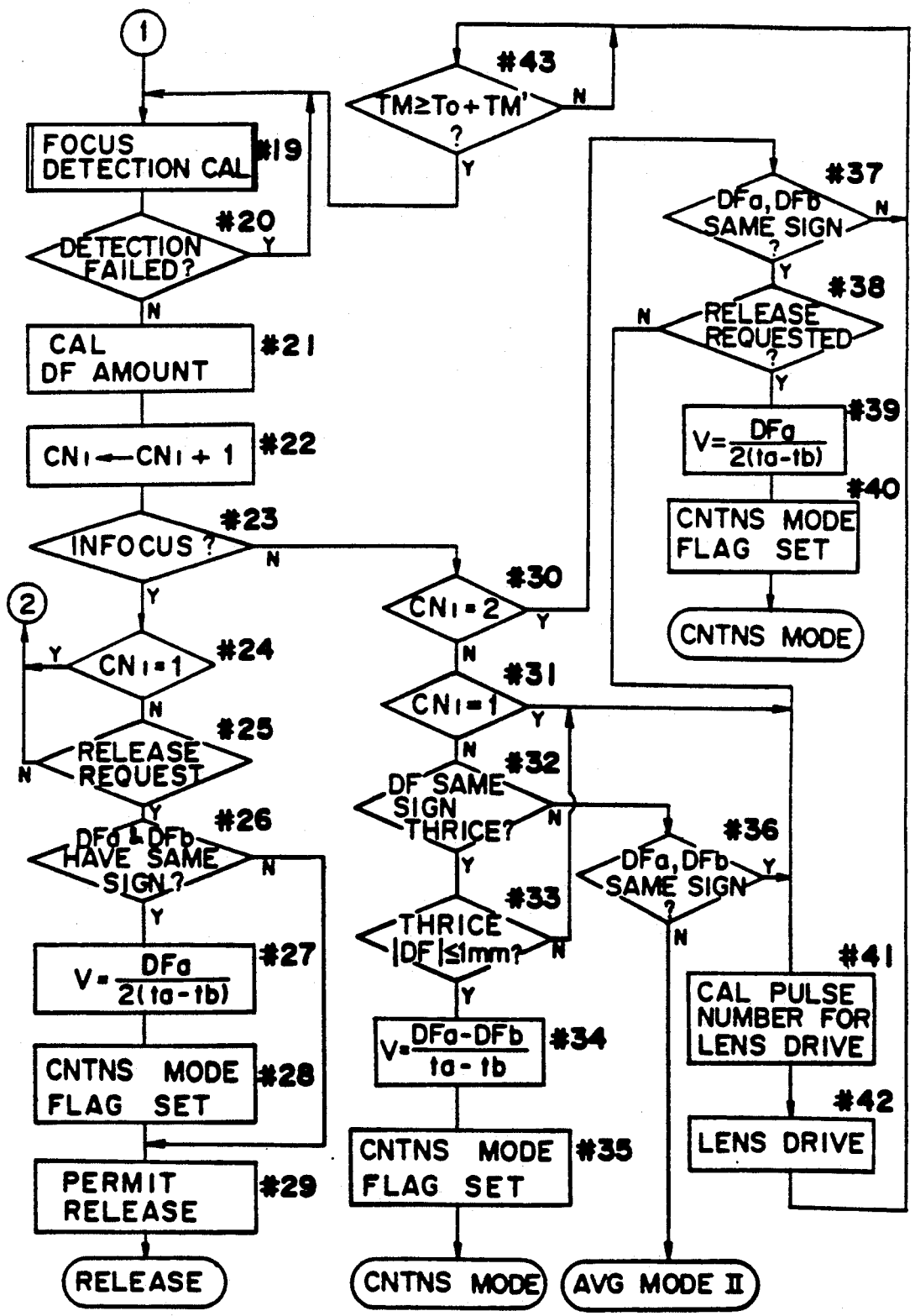
Figure 6:
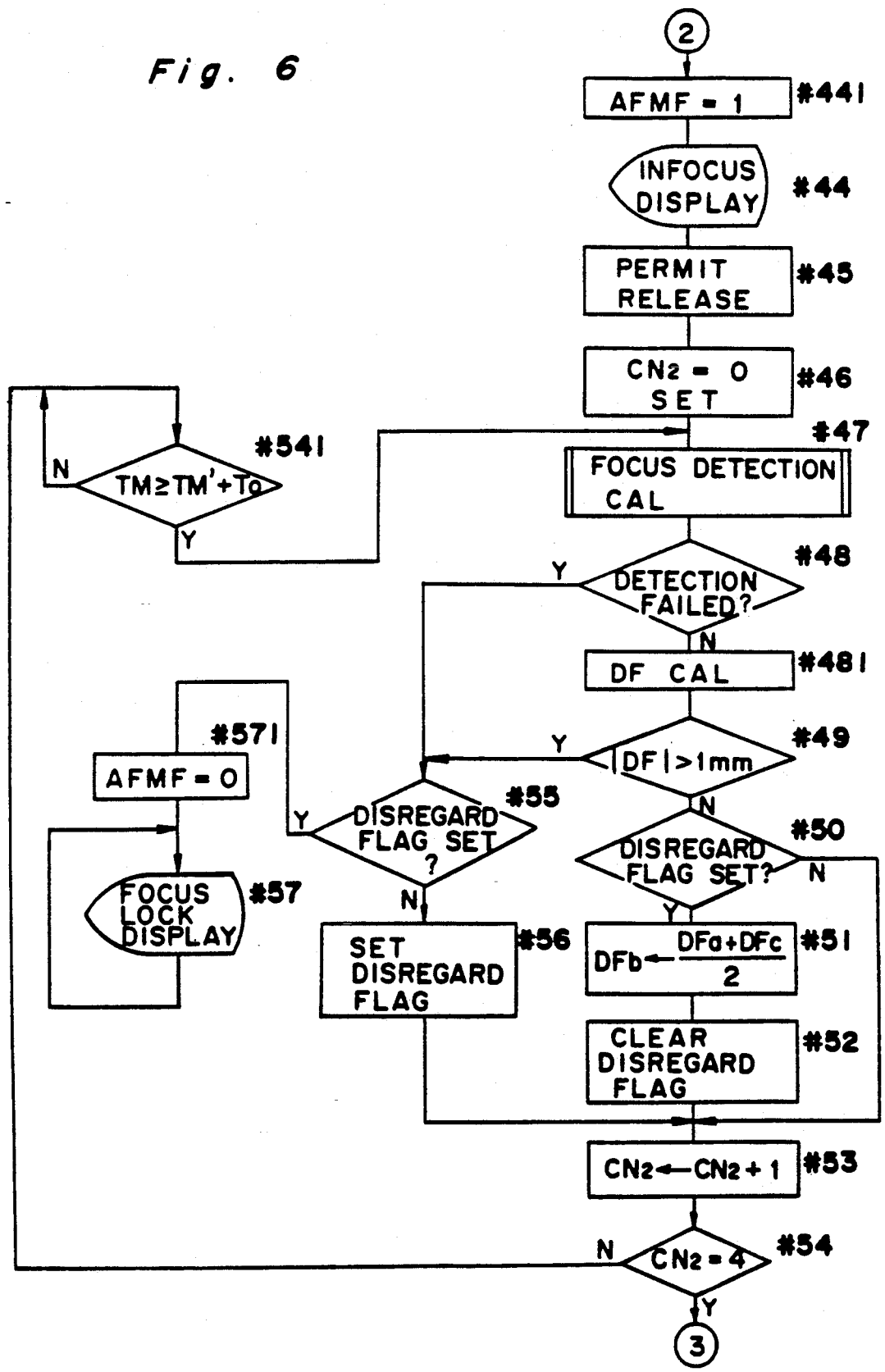

Referring to FIG. 5, the focus detection calculation is again carried out in the subroutine step #19. If the focus detection is not successful, the focus detection calculation is repeated again and again until the focus detection succeeds. When the focus detection succeeds, a defocus amount is calculated at step #21, and counter CN1 is incremented by one, and infocus detection is carried out in step #23. At this point, when the object is still or moving but accompanying a slow change of the infocus position, it is so detected at step #23 that the defocus amount calculated at step #21 is within an acceptable or tolerance range to be considered as an infocus condition. In this case, the program goes to step #24 to detect the count of the counter CN1. When the count of counter CN1 is one, meaning that the infocus condition is acquired after only one lens drive operation at step #17, the program goes to AF mode detection routine starting from step #441 (FIG. 6). On the other hand, if the infocus condition is not detected at step #23, it is assumed that the object has moved during the lens drive to such an amount that the image of the object is not any more in the infocus condition, or that the focus detection accuracy is so poor that the defocus amount is not stable. In such a case, the program goes to step #30.

If the count of counter CN1 is detected as one at steps #30 and #31 indicating that the number of times of the lens drive operation previously carried out is one, the program goes to step #41 to again calculate the number of pulses necessary to drive the lens. Then, the program goes to step #42 to drive the lens, and thereafter, time adjustment is carried out at step #43 to provide a predetermined time elapse before the next cycle starts. After counting the predetermined time, the program starts again from step #19. The predetermined time elapse is necessary to calculate, as will be described later, the moving speed of the object in the direction effecting the time change of the focusing position of the object image. If the predetermined elapse time for calculating the object speed is short, the calculated object speed will not be very precise. Since the CCD integration start time TM' is stored in the memory area in microcomputer 21 in a step within the subroutine of step #19, the program counts time until the counted result TM satisfies the following equation:

$$TM \geq To + TM'.$$

Thereafter, the program goes to step #19 for the second time.

After following steps #19-#22 to calculate the defocus amount and to increase the counter CN1 to two, the infocus detection is carried out at step #23. If it is detected that the infocus condition is acquired, the program goes to step #24 at which it is detected that CN1 is not equal to one. Thus, the program goes to step #25 at which input port IP2 of microcomputer 21 is scanned to detect the shutter release request, if there is such a request. In the case where the shutter release request is not present, the program goes to AF mode detection routine starting from step #441 (FIG. 6). In the case where the shutter release request is present, the program follows steps #26-#29 and in turn, to the shutter release routine (FIG. 12) so as to quickly respond to the shutter release request. At step #26, the defocus amount DFb obtained in the previous cycle (herein, previous cycle means one cycle before the present cycle) of operation, and the defocus amount DFa obtained in the present cycle of operation are compared to detect whether or not the defocus amounts DFa and DFb have the same sign (plus or minus sign). If the defocus amounts DFa and DFb have the same sign, it is understood that the focusing position of the object image is shifted in the same direction and, therefore, it is so detected that the object is moving in the same direction both in the previous and present cycles. In this case, at step #27, the speed of the moving object is calculated and, at step #28, an continuous mode flag is set. The continuous mode is a mode in which the lens drive is constantly controlled in compliance with the moving object. Furthermore, at step #29, shutter release is permitted and, thereafter, a shutter release routine (FIG. 12) is carried out.

At step #27, the calculation of the object speed V is done by obtaining a half of the defocus amount DFa divided by a time difference (ta-tb) between the focus detection time in the previous cycle and that in the present cycle, as given by the following equation:

$$V = DFa/2(ta-tb).$$

In the case where the calculated defocus amount varies to a great extent due to fluctuation of output of the CCD or low realiability of focus detection calculation under low brightness, the calculated object speed DFa/(ta-tb) may be greater than the actual object speed. To avoid such a misleading, the calculated speed is divided by 2, as shown in the above equation. From a practical viewpoint, the presently obtained defocus amount DFa is within the acceptable or tolerance range to be considered as an infocus condition, the moving speed of the object is relatively small which is sufficient to activate the lens to follow and keep the infocus condition.

On the other hand, at step #26, if the defocus amounts DFa and DFb have different signs, it is understood that the focusing position of the object image is shifted in the opposite directions and, therefore, it is so detected that the object is moving not in the same direction during the previous and present cycles. In this case, the shutter release operation will be carried out without activating the lens to follow the infocus condition.

Then, at step #23, when the focus detection is resulted to be out of focus with the counter CN1 carrying 2, the program advances from step #30 to step #37. At step #37, the sign of the defocus amount DFa obtained in the previous cycle and that of the defocus amount DFb obtained in the present cycle are compared If the signs are the same indicating that the object is moving in the same direction both in the present and previous cycles, the program goes to step #38. If the signs are different indicating that the object is moving not in the same direction during the previous and present cycles, the program goes to step #43 without effecting the lens drive.

Figure 8:
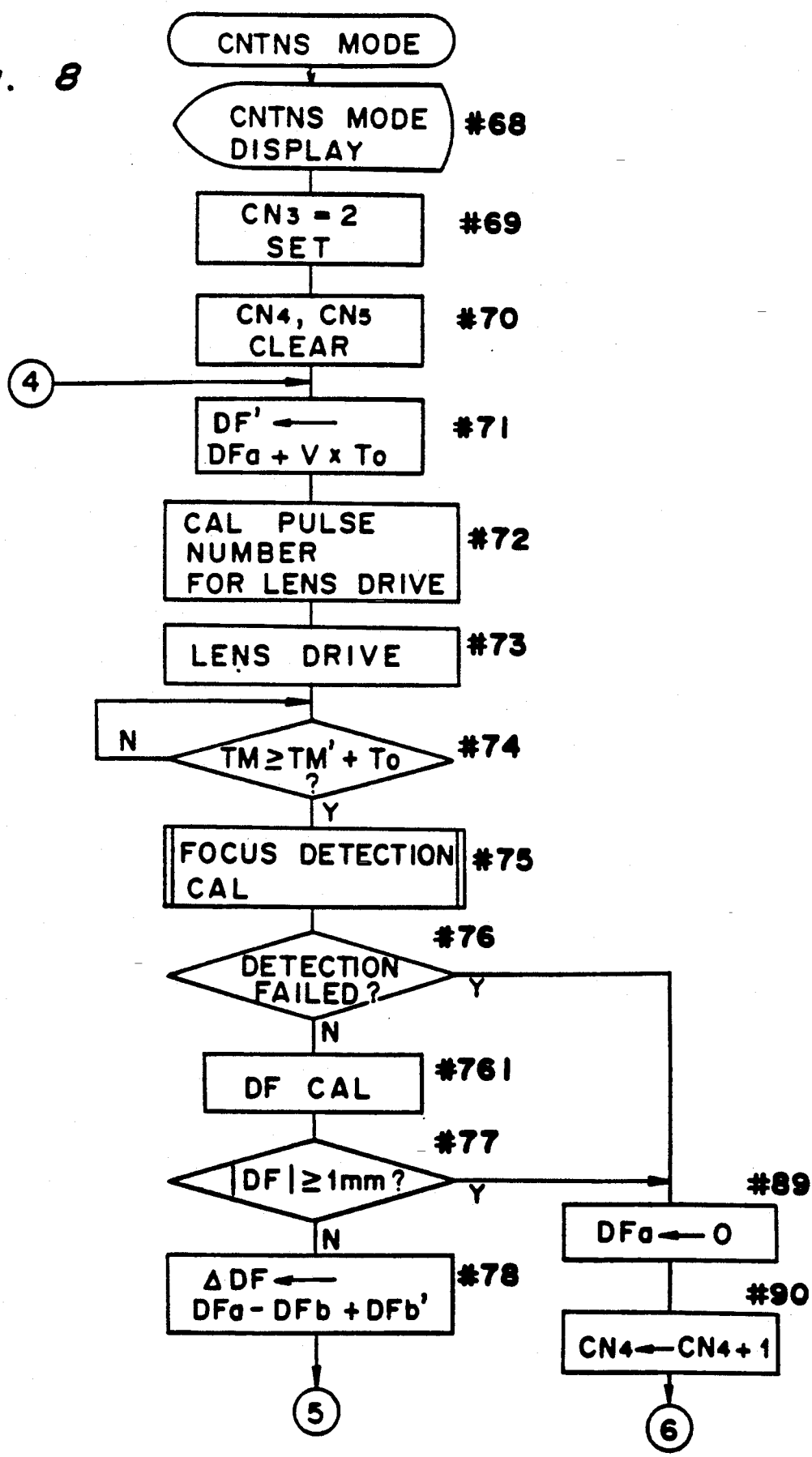
Figure 9:
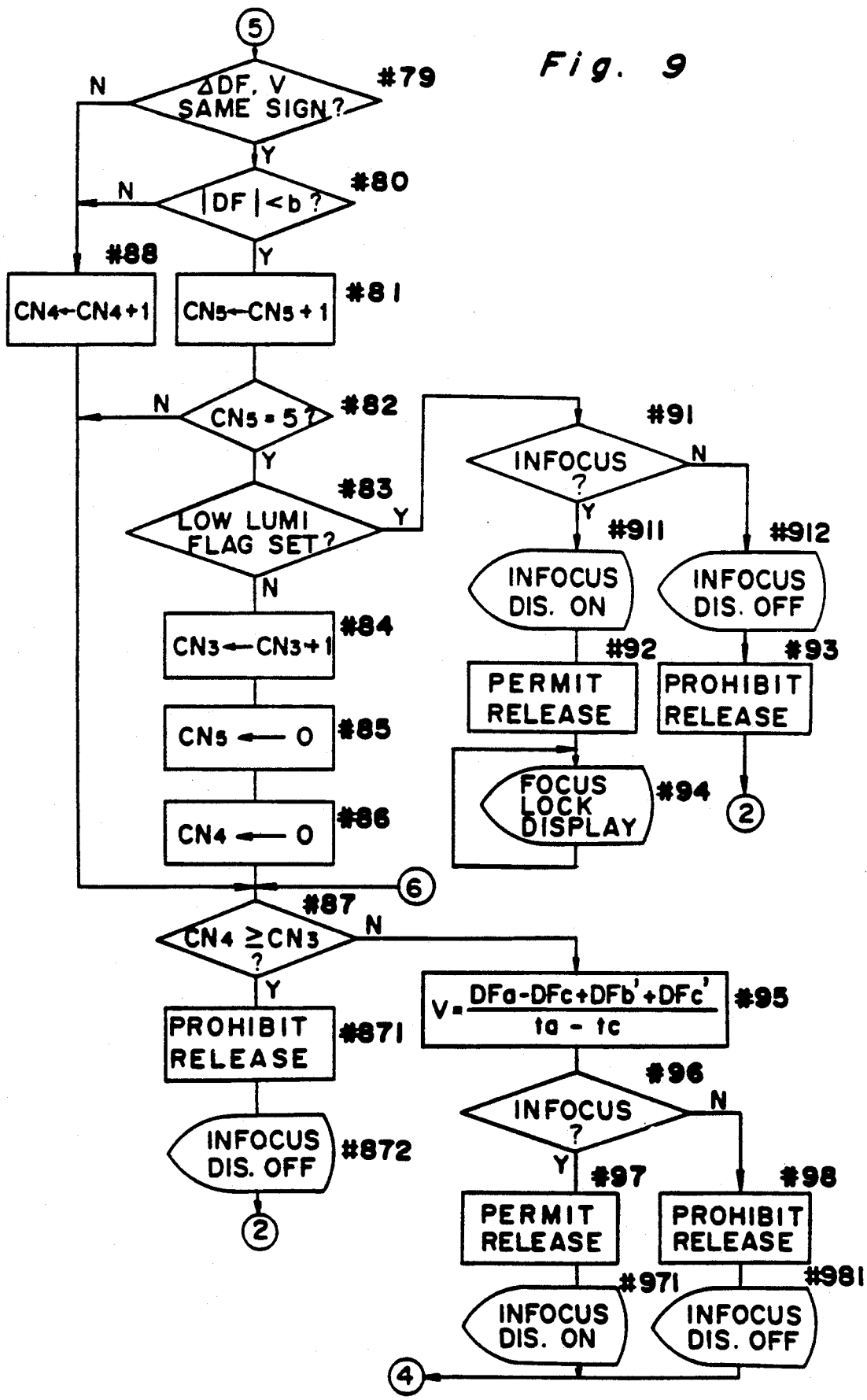

At step #38, it is detected whether the shutter release request is present or not. If the shutter release request is present, the object speed V is calculated at step #39, and a continuous mode flag is set at step #40. Thereafter, the program goes to a routine for controlling the continuous mode operation (FIGS. 8 and 9). At step #39, the speed calculation is done by dividing the present defocus amount DFa by a time difference (ta-tb), and further dividing the quotient by two. This calculation is the same as that carried out in step #27, but in this time, since the defocus amount DFa obtained in this cycle is not within the acceptable or tolerance range to be considered as an infocus condition, the moving speed V of the object is relatively high. Thus, the shutter release operation will not be carried out immediately, but first the continuous mode operation (FIGS. 8 and 9) is carried out to precisely calculate the object speed. Thereafter, the shutter release routine (FIG. 12) is effected.

At step #38, if the shutter release request is not present, the program goes to step #41 at which the number of pulses necessary to shift the lens is calculated. After the lens drive at step #42, the program goes to step #43. And then, steps #19-#23 are carried out again. At step #23, if the infocus condition is detected, the program goes to step #24, and if not detected, the program goes through steps #30 and #31 to step #32, since counter CN1 has counted up to 3. At step #32, when the three defocus amounts have the same sign, the program goes to step #33 at which it is detected whether the absolute value of each defocus amount is less than 1 millimeter, or not. If any defocus amount in absolute value is greater than 1 millimeter, there is a possibility that the defocus amount in problem is obtained by aiming some other object for the focus detection, i.e., for distance measuring. Therefore, in such a case, the program goes to step #41 to again carry out the focus detection. If the results at steps #32 and #33 are both YES, it is understood that the focus detections are carried out properly for the same object and that the object is moving in the same direction during the three detected cycles. In such a case, the program goes to step #34 to calculate the object speed V by the following equation:

$$V = (DFa - DFb)/(ta - tb).$$

Thereafter, continuous mode flag is set at step #35 and enters the continuous mode routine (FIGS. 8 and 9).

On the contrary, at step #32, if the signs of the three defocus amounts are not the same, the sign of present defocus amount DFa and that of previous defocus amount DFb are compared at step #36. If they are the same, the lens is again driven at steps #41 and #42, and then the time is adjusted at step #43 and repeats the focus detection. At step #32, if the signs are not the same, it is understqod that the focus detection accuracy is poor that the defocus amounts vary with a great difference. In this case, the program enters an average mode II (FIG. 10).

Figure 10:
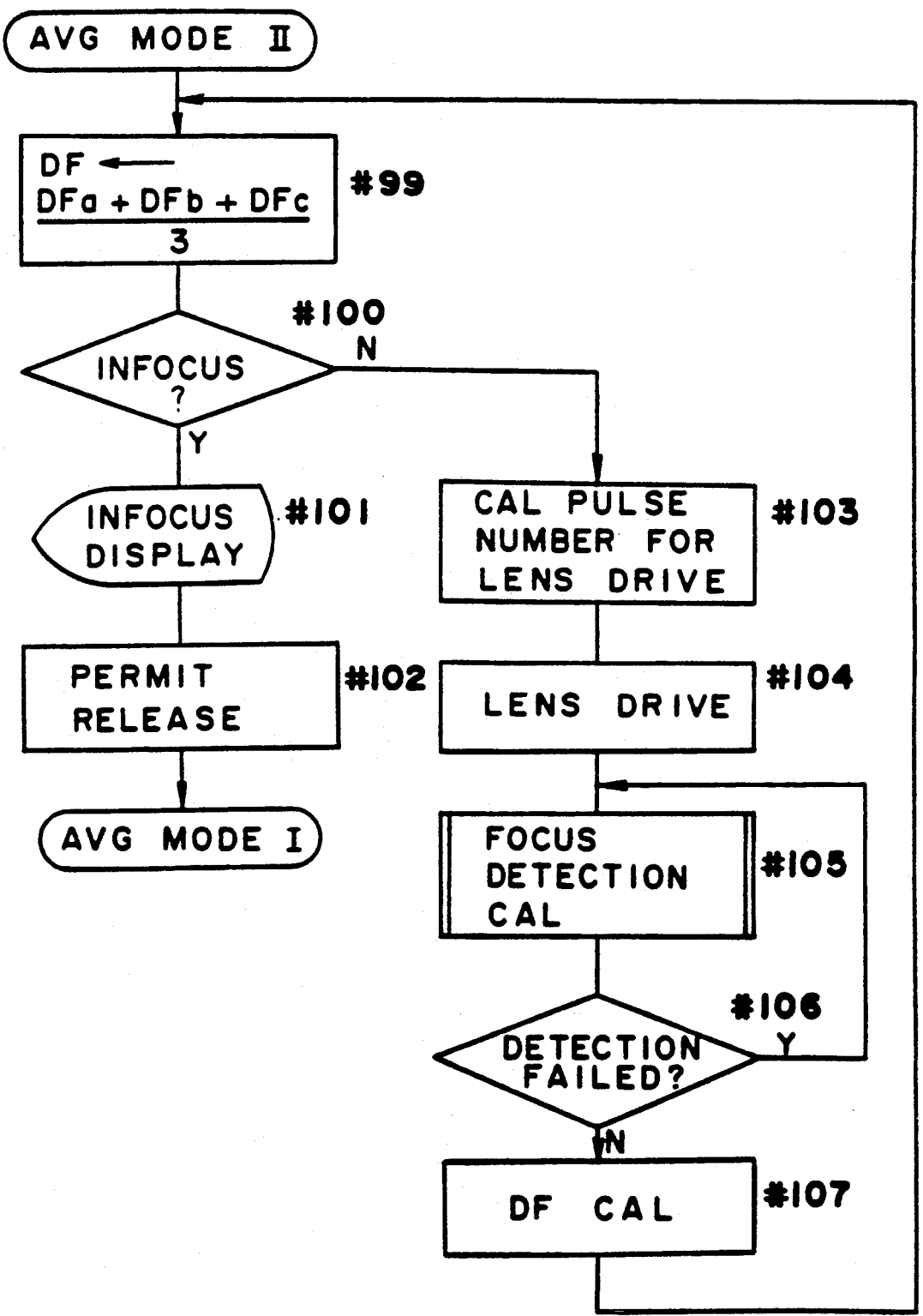

Referring to FIG. 10, a flow chart for the average mode II is shown. At step #99, an average defocus amount DF is calculated using the defocus amount DFa obtained in the present cycle, defocus amount DFb obtained in one round before cycle and defocus amount DFc obtained in two rounds before cycle by the following equation:

$$DF = (DFa + DFb + DFc)/3.$$

Figure 7:
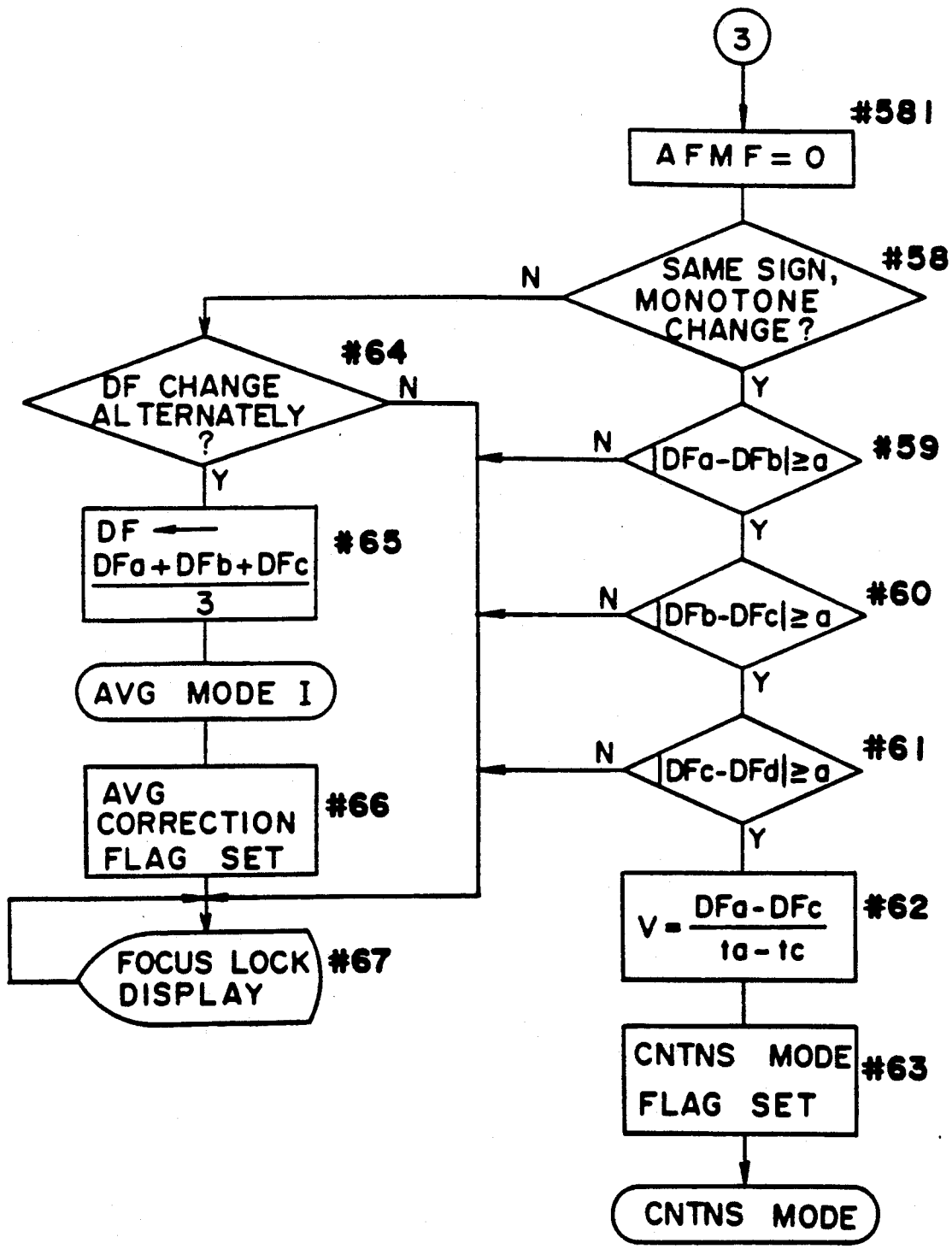

At step #100, it is detected whether or not the average defocus amount DF is within an acceptable or tolerance range to be considered as an infocus condition, or not. If the average defocus amount DF is within the acceptable range to be considered as an infocus condition, an infocus display is effected at step #101. Then, the shutter release is permitted at step #102 and an average mode I operation (FIG. 7) starts. As shown in FIG. 7, in the average mode I, an average correction flag is set at step #66 and the focus lock is displayed at step #67. Thereafter, the program waits for the shutter release operation.

At step #100 in FIG. 10, if the average defocus amount DF is not within the acceptable range to be considered as an infocus condition, the program goes to step #103 at which the number of pulses necessary for the lens drive is calculated. Then, at step #104, the lens is driven to a calculated position, and again, the focus detection calculation is done at step #105. Then, if it is detected at step #106 that the focus detection at step #105 is not successful, the focus detection at step #105 is repeated until the focus detection succeeds. Then, a defocus amount is calculated at step #107 and the program returns to step #99 to repeat the operation of steps #99–#107 until the average defocus amount DF falls within the acceptable range to be considered as an infocus condition.

The operation so far described can be summarized as follows. After the defocus calculation, the lens is driven to a calculated focusing position. Then, if the lens is not in the infocus condition, it is understood such that the focus condition varying speed of the object image is so fast that the lens movement can not catch up with the focus condition varying speed, or such that the accuracy of the focus detection is so poor that the defocus amounts obtained in subsequent cycles show great differences. In such a case, continuous mode operation or average mode II operation is carried out depending on the coincidence of the sign of the defocus amounts. Also, a case in which the shutter release request is produced during the AF operation is described.

When the object speed is relatively high, the control under the continuous mode as described above is effective. However, when the object speed is relatively slow, the object image will still be in the infocus zone even after the time lag obtained during the lens drive to the calculated focusing position, resulting in infocus detection at step #23. In such a case, even after the infocus detection at step #23, continuous mode operation is carried out at the AF mode detection routine starting from step #441 (FIG. 6). Next, the description is directed to the AF mode detection.

Referring to FIG. 6, at step #441, AFMF flag is set indicating that the program has entered the AF mode detection routine. At step #44, infocus display is effected to inform the user that the infocus condition is obtained. Then, during the infocus condition being obtained, the shutter release operation is permitted (step #45) such that the interruption prohibition is freed to allow interruption by the signal applied to the interruption port INT2 (FIG. 2). Thus, whenever a shutter release request is present, the shutter release operation will be carried out immediately. Then, at step #46, counter CN2 for counting the number of focus detection operations executed for the AF mode detection is cleared. A focus detection calculation is carried out at step #47, and when it is detected at step #48 that the focus detection is not possible, the program goes to step #55. The reason for the focus detection failure may be such that the object itself has a low contrast, such as in the case of snow scene, or that the focus detection calculation at step #47 is effected by aiming an object which is located closer than or far off the original aiming object. At step #48, when it is detected that focus condition is obtained, a defocus amount DF is calculated at step #481. When the defocus amount DF in absolute value showed greater than one millimeter at step #49, it is so assumed that the focus detection at step #47 is effected by aiming an object which is located closer than or far off the original aiming object. In this case, the program also goes to step #55. Steps #55–#57 are provided for the cases when the focus detection calculation result obtained at step #47 is beyond expectation. At step #55, it is detected whether a disregard flag is set or not. The disregard flag indicates that the focus detection calculation result obtained at step #47 should be disregarded, and this flag is used for detecting a series of unexpected results obtained while repeating the cycle passing step #47. Initially, disregard flag is reset so that the program advances from step #55 to #56 at which the disregard flag is set. Then, in the next cycle of operation repeating from step #47, if the focus detection calculation showed unexpected result, the program again goes to step #55 and further to step #571, because in the second cycle the disregard flag is already set. At step #571, AFMF flag is reset to leave from the AF mode detection routine, and thereafter, focus lock display is effected, and the shutter release is waited.

The reason for terminating the AF mode detection after obtaining two consecutive results of unexpected focus detection calculation at step #47 is as follows. It is necessary to keep the moving object captured in the focus frame to properly operate under the continuous mode so that the lens actively changes the focusing condition to continuously focus on the moving object. However, due to the camera wobbling or the fast moving object, the object may be instantaneously off set from the focus frame, resulting in an unexpected calculation result at step #47. If such an unexpected calculation result occurs for the first time, then the calculated result is disregarded, and the same cycle repeats again from step #47. If the unexpected calculation result occurs twice in the subsequent cycles, it is assumed that the operator intentionally off sets the object from the focus frame to obtain his desired framing after obtaining the infocus condition of the object, thereby requesting the focus lock operation. Thus, when the unexpected calculation results are obtained twice in a row, a single mode is set as the AF mode. Thus, the focus lock is displayed, and the shutter release is waited.

If the detected results at steps #48 and #49 are both negative, it is understood that the object aimed for the focus detection is the same and that the defocus amount DF is within a reasonable change. In this case, the program goes to step #50 at which it is detected whether the disregard flag is set or not. If the disregard flag is set as effected during the previous cycle, it is understood that the focus detection calculation in the previous cycle showed unexpected result. Thus, at step #51, a substitute defocus amount DFb for the previous cycle is obtained by calculating an average using the defocus amount DFa obtained in the present cycle, and the defocus amount DFc obtained in the cycle before the previous cycle. Thereafter, the disregard flag is cleared at step #52, and the program advance to step #53. At step #50, if the disregard flag is not set, there is no need to provide a substitute defocus amount, so that the program advances directly to step #53. At step #53, counter CN2 counts up, and at step #54, it is checked that the operation through steps #47-#54 has been repeated until counter CN2 has counted to 4. While counter CN2 still carrying a number less than 4, the program goes to step #541 to adjust time such that it is waited until the time TM counted by timer 29 becomes equal to or greater than (TM'+To).

After carrying out the focus detection for four times, the program goes to step #581 (FIG. 7) at which AFMF flag indicating the AF mode detection is reset, and further to step #58. At step #58, it is detected whether or not the four defocus amounts DFa, DFb, DFc and DFd obtained in four cycle operations through previous steps #47-#54 have the same sign, and whether or not the defocus amounts change monotonously. If YES, the program goes to step #59 at which it is detected whether or not the difference between the first and second defocus amounts DFa and DFb in the absolute value is equal to or greater than a predetermined threshold value a. Similarly, at step #60, it is detected whether or not the difference between the second and third defocus amounts DFb and DFc in the absolute value is equal to or greater than the predetermined threshold value a, and at step #61 it is detected whether or not the difference between the third and fourth defocus amounts DFc and DFd in the absolute value is equal to or greater than the predetermined threshold value a. In this manner, the differences in absolute values between the neighboring two defocus amounts are examined. If all these differences are detected to be equal to or greater than the threshold value a, it is assumed that the object is moving and, therefore, the continuous mode operation will be carried out after steps #62 and #63. At step #62, initial speed V of the object is calculated by the following equation:

$$V = \frac{DFa - DFc}{ta - tc},$$

and at step #63, continuous mode flag is set. At step #62, the initial object speed V is calculated using the present defocus amount DFa and the defocus amount DFc obtained in the cycle before the previous cycle, so that the speed V can be calculated with a high accuracy using sufficiently long time difference (ta−tc) and fresh data.

At step #58, if it is so detected that all of the defocus amounts DFa, DFb, DFc and DFd do not have the same sign or that they do not change monotonously, the program goes to step #64 at which the stability of each defocus amounts is detected by detecting whether the sign of the difference of the defocus amounts obtained by the two focus detection calculations changes alternately, or not. If YES, the calculation of the defocus amount DF is considered to be unstable and therefore, the program goes to step #65 to calculate an average defocus amount DF by the following equation:

$$DF = \frac{DFa + DFb + DFc}{3}.$$

entering average mode I, to step #66 to set average correction flag, and to step #67 to display the focus lock. Thereafter, it is waited for the shutter release operation.

On the contrary, if the defocus amounts do not change alternately as detected at step #64, or if the difference in absolute value between any of the neighboring two defocus amounts showed less than the predetermined threshold a, it is considered that the object is not moving and that the defocus amount calculations are carried out with high accuracy. In this case, the program advances to step #67 without the average processing, and to step #67 to display the focus lock. Then, it is waited for the shutter release operation.

The description hereinabove, is directed to the routine from the start of the AF operation to the end of the AF mode detection.

Referring to FIG. 8, the description is now directed to the program after entering the continuous mode routine. At step #68, continuous mode display is effected to inform the operator of entering the continuous mode operation. Then, at step #69, a counter CN3 which is used for the detection of timing when to leave from the continuous mode operation, is loaded with two. At step #70, counters CN4 and CN5 are cleared. Counter CN4 is used for counting the number of times of failure of the focus detection calculation executed after entering the continuous mode operation, and counter CN5 is used for counting the number of times of proper focus detection calculation executed. At step #71, in case the lens drive is not effected in the next focus detection cycle, an anticipated defocus amount DF' is calculated by the following equation DF'=DFa+V x To wherein DFa is the newly obtained defocus amount, V is the calculated object speed, and To is a cycle period for the focus detection calculation. Based on the anticipated defocus amount DF', the number of pulses necessary to drive the lens is calculated in step #72, and the lens is driven at step #73. Thereafter, the program goes to step #74 to adjust time such that it is waited until the time TM counted by timer 29 becomes equal to or greater than (TM'+To).

From strict viewpoint, the cycle period To used at step #71 should be changed to anticipated cycle period To' which includes the lens drive time, but to simplify the description, it is so considered that To≈To' meaning that there is scarcely any time for the lens drive. The lens drive at step #73 is done for an amount compensating the anticipated defocus amount DF' prepared for the case of no lens drive, so that if the focus detection calculation is effected at step #75, the calculated defocus amount will be approximately equal to zero. At step #76, it is detected whether or not the defocus amount calculation was successful. When the focus detection is not properly carried out due to the the camera wobbling or other reasons, as mentioned above, the program advances to step #89. When the focus detection is properly carried out at step #76, the program goes to step #761 to calculate a defocus amount DF. If the absolute value of the calculated defocus amount |DF| is detected to be equal to or greater than one millimeter, the program goes to step #89 to take the same step as in the case when the focus detection at step #75 was not properly calculated. At step #89, the present defocus amount DFa is set to zero, because the lens has been already shifted so that the defocus amount can be made approximately equal to zero. At step #90, counter CN4 for counting the number of failure of the focus detection calculation is incremented by one. This is to enable the operation to leave from the continuous mode at step #87 in FIG. 9 when the focus detection calculation has failed repeatedly for a number of times. At step #77, if it is so detected that |DF|<1 millimeter, the program goes to step #78 at which a defocus amount difference ΔDF representing the difference between the location of the object in this cycle and that in the previous cycle is calculated.

Figure 13:
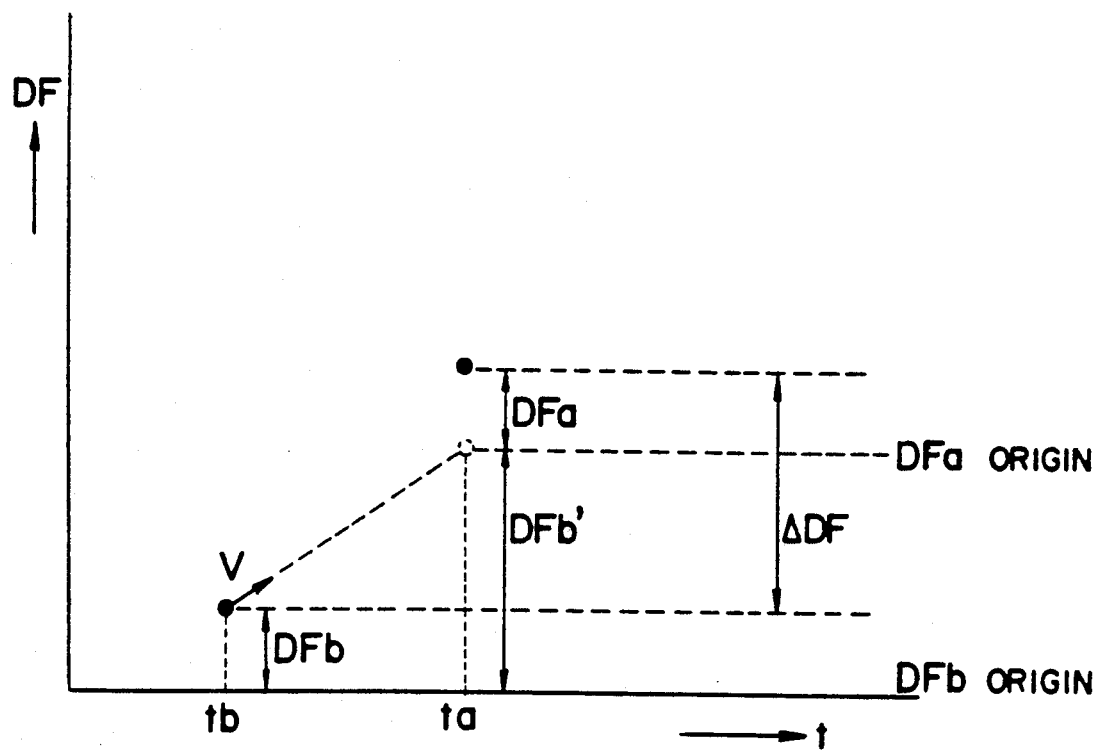
FIGS. 13 and 14 are graphs showing methods to calculate defocus amount difference in different situations.

Referring to FIG. 13, a graph is shown for explaining a method to calculate the defocus amount difference ΔDF. In FIG. 13, DFa origin represents a lens location when the focus detection is effected during the present cycle of operation, and DFb origin represents a lens location when the focus detection is effected during the previous cycle of operation. The graph reads such that since the lens is located at the DFb origin at the focus detection time tb in the previous cycle, the defocus amount DFb is observed in the previous cycle operation. The anticipated defocus amount DFb' calculated in the previous cycle for the lens drive is obtained by multiplying the object speed V by the time difference (ta−tb) between the focus detection time tb of the previous cycle and the focus detection time ta of the present cycle to obtain an anticipated moved distance of the object, and further adding the previous defocus amount DFb to it. Therefore, at the focus detection time ta of the present cycle, the lens is already shifted to the DFa origin, but actually, the object is off set from the anticipated position, so that in the present cycle of operation a defocus amount DFa is produced. In this case, the defocus amount difference ΔDF which is a difference between the object position at the previous cycle focus detecting time tb and the object position at the present cycle focus detecting time ta, is obtained by adding the present defocus amount DFa with the previous anticipated defocus amount DFb', and further subtracting the previous defocus amount DFb.

At step #79 (FIG. 9), the sign of the defocus amount difference ΔDF and the sign of the object speed V are compared. If the signs are different, it implies that the object is actually moving in the direction opposite to the calculated direction for the object speed V. In this case, the focus detection is carried out improperly and, therefore, at step #88, counter CN4 is incremented by one. Also, at step #80, if the absolute value of the defocus amount DF is greater than a predetermined threshold b, it is so understood that the actually measured defocus amount differs greatly with the anticipated defocus amount and, therefore, it is so judged again that the focus detection is carried out improperly and, therefore, the program goes to step #88. If it is detected results are affirmative at steps #79 and #80, the program goes to step #81 at which counter CN5 for counting the number of times of the proper focus detection operations is incremented by one.

At step #82, if counter CN5 has not counted up to five, the program goes to step #87 at which the contents of counters CN3 and CN4 are compared. Initially, counter CN3 is loaded with two, so that counter CN4 for counting the number of times of improper focus detection operations is compared with "two". If the content of counter CN4 is equal to or greater than two, the program goes to step #871 for prohibiting the shutter release and step #872 for turning off the infocus indication, and returns back to AF mode detection routine (FIG. 6), and repeating the same operation. This is to permit escape from the continuous mode operation by the comparison between the contents of counters CN4 and CN3 in case when the operation falsely entered the continuous mode.

On the other hand, in the case when counter CN5 has counted up to five, the low luminance flag is checked at step #83. As described above, generally when the low luminance flag is set, the CCD integration will be carried out with the aid of auxiliary light. Since the use of the auxiliary light accompanies high power consumption, it is not preferable to carry out the focus detection calculation limitlessly. Therefore, when counter CN5 has counted up to five the operation leaves from the continuous mode. At step #83, if the low luminance flag is set, it is detected at step #91 whether or not the infocus condition is obtained. If yes, the program goes to step #911 to turn on the infocus indication and subsequently to step #92 to permit the shutter release and further to step #94 to display the focus lock in place of the continuous mode indicating the operator that the continuous mode is ended and the focus lock mode is entered.

If it is so detected at step #91 that the infocus condition is not obtained, the infocus indication is turned off at step #912, the shutter release is prohibited at step #93 and, thereafter, the program returns back to AF mode detection. On the other hand, in the case when the auxiliary light is not necessary, there will be no drawback of power consumption and thus, the continuous mode continues. At step #84, counter CN3 is incremented by one. Furthermore, at steps #85 and #86, counters CN4 and CN5 are cleared. Counter CN3 carries a parameter which is used for detecting the timing when to leave the continuous mode, as used in step #87. Since the contents of counter CN3 increases relatively to the time elapse (number of times of the focus detection) from the entering of the continuous mode, the condition for leaving the continuous mode as detected at step #87 becomes gradually harder. In other words, if a long time elapses from the entering of the continuous mode, it is positive that the object is moving and, therefore, the continuous mode operation to keep the lens in the properly focused condition continues even if the number of times of the improper focus detection increases due to various, reasons such as camera wobbling.

At step #87, if the detected result is to continue the continuous mode, the program goes to step #95 at which the object speed V is calculated again in a more accurate manner. More specifically, at step #95, in order to improve the accuracy of the object speed V, a difference between the object location obtained in the present cycle and that obtained in the cycle before the previous cycle (defocus amount difference $\Delta DF$) is divided by the time difference as given by the following equation:

$$V = \frac{DFa - DFc + DFb' + DFc'}{ta - tc}$$

Figure 14:
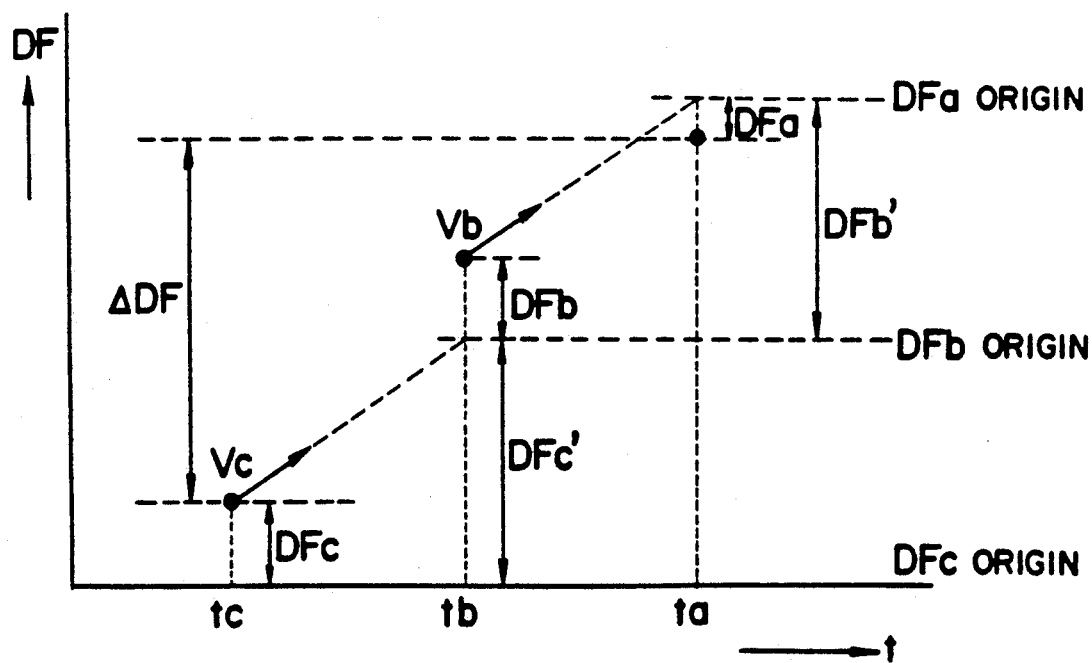

Referring to FIG. 14, a graph is shown for explaining a method to calculate the above described defocus amount difference $\Delta DF$. In FIG. 14. DFa origin represents a lens location when the focus detection is effected during the present cycle of operation, DFb origin represents a lens location when the focus detection is effected during the previous cycle of operation, and DFc origin represents a lens location when the focus detection is effected during the cycle before the previous cycle. The graph reads such that since the lens is located at the DFc origin at the focus detection time tc in the cycle before the previous cycle, the defocus amount DFc is observed in the cycle before the previous cycle. The anticipated defocus amount DFc' calculated in the cycle before the previous cycle for the lens drive is obtained by multiplying the object speed Vc by the time difference (tb−tc) between the focus detection time tc of the cycle before the previous cycle and the focus detection time tb of the previous cycle to obtain an anticipated moved distance of the object, and further adding the previous defocus amount DFC to it. Therefore, at the focus detection time tb of the previous cycle, the lens is already shifted to the DFb origin, but actually, the object is off set from the anticipated position, so that in the previous cycle of operation a defocus amount DFb is produced. The anticipated defocus amount DFb' calculated in the previous cycle for the lens drive is obtained by multiplying the object speed Vb by the time difference (ta−tb) between the focus detection time tb of the previous cycle and the focus detection time ta of the present cycle to obtain an anticipated moved distance of the object, and further adding the previous defocus amount DFb to it. Therefore, at the focus detection time ta of the present cycle, the lens is already shifted to the DFa origin, but actually, the object is off set from the anticipated position, so that in the present cycle of operation a defocus amount DFa is produced. In this case, the defocus amount difference $\Delta DF$ which is a difference between the object position at the cycle before the previous cycle focus detecting time tc and the object position at the present cycle focus detecting time ta, is obtained by adding the present defocus amount DFa with the anticipated defocus amount DFb' obtained in the previous cycle and also with the anticipated defocus amount DFc' obtained in the cycle before the previous cycle, and further subtracting the defocus amount DFc obtained in the cycle before the previous cycle. Thus, the defocus amount difference $\Delta DF$ can be given by the following equation.

$$\Delta DF = DFa - DFc + DFb' + DFc'$$

By dividing the above given defocus amount difference $\Delta DF$ by the time difference (ta−tc) of the focus detection, the object speed V is obtained.

Thereafter, at step #96, it is detected whether the infocus condition is obtained, or not. If YES, the program goes to step #97 to permit the shutter release and turn on the infocus indication at step #971, and if NOT to step #98 to prohibit the shutter release and turn off the infocus indication at step #981, and to repeat the procedure from step #71. When the shutter release is permitted, the shutter release routine (FIG. 12) is called to execute the shutter release operation, as will be described below.

Figure 12:
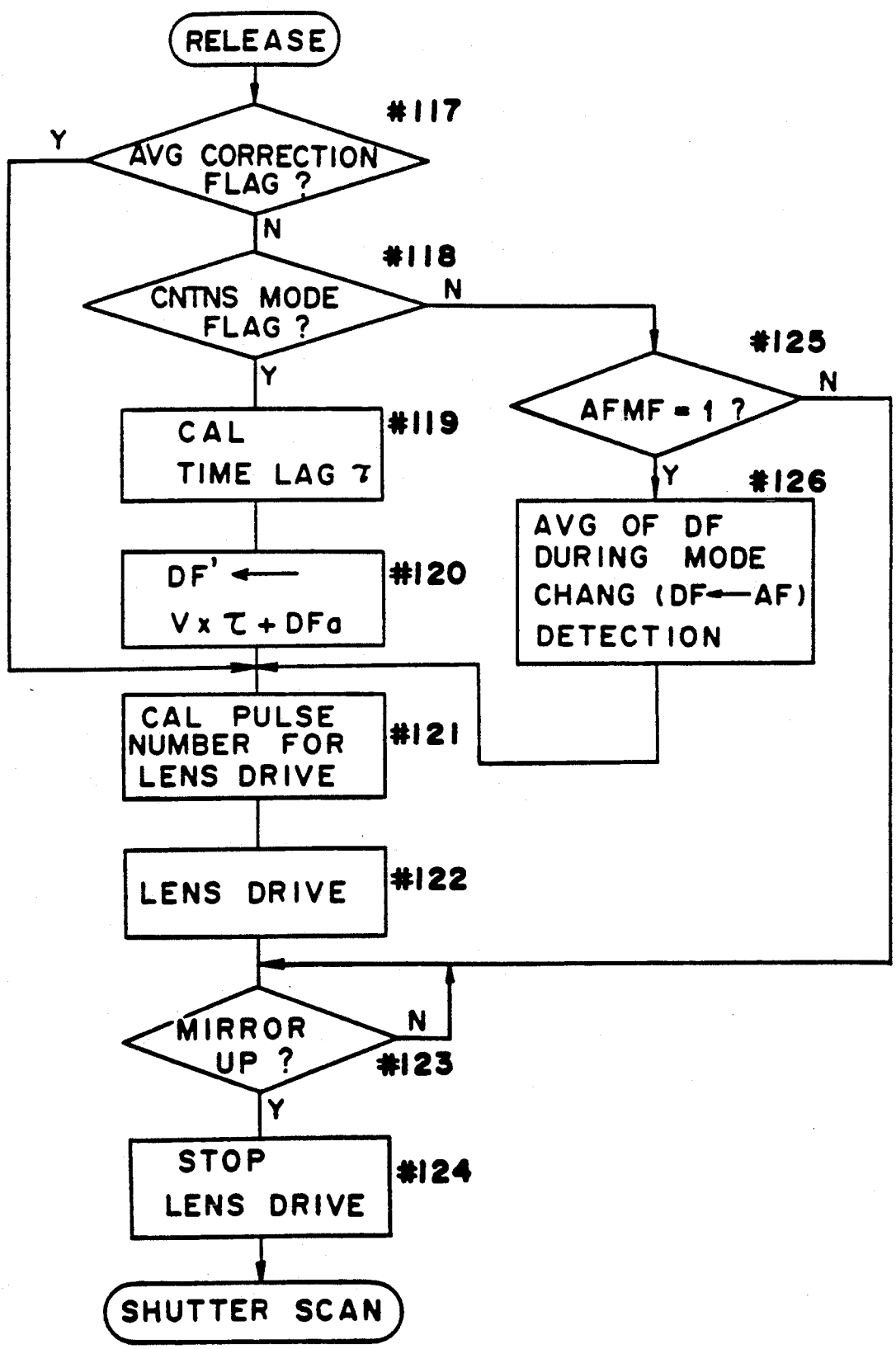

Referring to FIG. 12, at step #117, it is detected whether the average correction flag is set, or not. If the average correction flag is set, the program goes to step #121 to calculate the number of pulses necessary to drive the lens in accordance with the calculated defocus amount, and further to step #122 to drive the lens. Then, at step #123, input port IP3 is monitored to confirm the mirror up operation and, at step #124 the lens drive is stopped and, thereafter, the shutter is operated to perform the exposure.

At step #117, if the average correction flag is not set, the program goes to step #118 to detect whether the continuous mode flag is on, or not. If NOT, the program goes to step #125 to detect whether the shutter release has been operated during the AF mode detection by the detection of AFMF flag. If the AFMF flag is set, the program goes to step #126 at which an average of the defocus amounts obtained during the detection, is calculated for use in correcting the lens position in compliance with the possible object movement effected during the detection mode, and further to steps #121 and #122 to actually drive the lens. For example, if the focus detection is carried out twice to obtain two defocus amounts DF1 and DF2, an average DF $$DF = \frac{(DF1 + DF2)}{2}$$

is calculated. If the AFMF flag is not set, the program advance to step #123 without driving the lens.

At step #118, if the continuous mode flag is set, the program goes to step #119 at which a time lag $\tau$ is calculated. The time lag $\tau$ represents a time difference between the time of the latest focus detection calculation and the time of actual shutter operation. At step #120, a corrected defocus amount DF' obtained by multiplying the object speed V by the time lag $\tau$ and further adding the latest defocus amount DFa is calculated. The corrected defocus amount DF' represents an anticipated defocus amount at the time of actual shutter operation. Then, the program goes to step #121 to calculate the number of pulses necessary to drive the lens in accordance with the corrected defocus amount, and further to step #122 to drive the lens. Thereafter, the program follows steps #123 and #124 and effects the shutter operation. Thus, the control is obtained to properly focus the object at the actual shutter operation. The description directed to the exposure control will be omitted.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An AF camera for automatically controlling a photographing lens for focusing an object comprising:
    focus detection means for detecting repeatedly a focusing condition of said photographing lens with respect to said object, and for producing a focusing signal based on the detected result;
    focus adjusting means for adjusting said photographing lens based on the focusing signal;
    focus lock means for locking said focus adjusting means to terminate the movement of said photographing lens;
    control means for controlling said focus adjusting means and said focus lock means, said control means being operable in a first mode wherein the focus adjusting means is carried out even after the detection of infocus condition, and a second mode wherein the focus lock means is activated in response to the detection of infocus condition;
    movement detection means for detecting whether or not the object is moving by the input of said focusing signals repeatedly;
    mode selecting means, responsive to the movement detection means for selecting the mode of said control means so as to select said first mode when said movement detection means detects that the object is moving, and to select said second mode when said movement detecting means detects that the object is not moving;
    first display means for producing a first display during said first mode; and
    second display means for producing a second display during said second mode.

2. An AF camera system for automatically controlling a photographing lens for focusing an object comprising:
    focus detection means for detecting a focusing condition of said photographing lens with respect to said object, and for producing a focusing signal based on the detected result;
    infocus condition detection means for detecting, based on said focusing signal, an infocus condition of said photographing lens with respect to said object;
    determining means for determining, based on the focusing signal, whether or not the focus lock should be carried out after said infocus condition detection means detects the infocus condition, and for producing a focus lock signal when it is determined that the focus lock should be carried out;
    focus lock means for effecting the focus lock in response to said focus lock signal;
    first display means for producing a first display when said infocus condition detection means detects the infocus condition; and
    second display means for producing a second display in response to said focus lock signal.

3. An AF camera as claimed in claim 2, wherein said determining means includes movement detection means for detecting the movement of said object, and wherein said determining means determines that the focus lock should be carried out when said movement detection means is not detecting that the object is moving.

4. An AF camera as claimed in claim 2, wherein said determining means determines that the focus lock should be carried out in response to the infocus condition detected by said infocus condition detection means.

5. An AF camera system for automatically controlling a photographing lens for focusing an object comprising:
    movement detection means for detecting a movement of the object, and for producing a movement signal relating to the movement of said object;
    focus detection means for detecting a focusing condition of said photographing lens with respect to said object, and for producing a focusing signal based on the detected result;
    focus adjusting means for adjusting said photographing lens based on the focusing signal, said focus adjusting means being operable in a first mode wherein an adjusting operation is carried out in accordance with the focusing signal and the movement signal when the object is moving and a second mode wherein the adjusting operation is carried out in accordance with the focusing signal when the object is not moving;
    infocus condition detecting means for detecting, based on said focusing signal, an infocus condition of said photographing lens with respect to said object;
    first display means for producing a first display when said infocus condition detection means detects the infocus condition; and
    prohibiting means for prohibiting the operation of said infocus display means when said adjusting means is operated in the first mode even if said infocus condition detecting means detects the infocus condition.

6. An AF camera as claimed in claim 5, wherein said focus adjusting means is carried out even after the detection of infocus condition in the first mode.

7. An AF camera as claimed in claim 5, further comprising second display means for producing a second display during said first mode.

* * * * *